US010275152B2

United States Patent
Fallah

(10) Patent No.: US 10,275,152 B2
(45) Date of Patent: Apr. 30, 2019

(54) ADVANCED METHODS AND SYSTEMS FOR TEXT INPUT ERROR CORRECTION

(71) Applicant: Idelan, Inc., San Jose, CA (US)

(72) Inventor: Farzan Fallah, San Jose, CA (US)

(*) Notice: Subject to any disclaimer, the term of this patent is extended or adjusted under 35 U.S.C. 154(b) by 175 days.

(21) Appl. No.: 14/924,610

(22) Filed: Oct. 27, 2015

(65) Prior Publication Data

US 2016/0124926 A1 May 5, 2016

Related U.S. Application Data

(60) Provisional application No. 62/069,740, filed on Oct. 28, 2014, provisional application No. 62/209,795, filed on Aug. 25, 2015.

(51) Int. Cl.
*G06F 17/20* (2006.01)
*G06F 3/0488* (2013.01)
*G06F 17/27* (2006.01)

(52) U.S. Cl.
CPC ........ *G06F 3/04886* (2013.01); *G06F 3/0488* (2013.01); *G06F 17/273* (2013.01)

(58) Field of Classification Search
CPC .................................................. G06F 3/04886
See application file for complete search history.

(56) References Cited

U.S. PATENT DOCUMENTS

| | | | |
|---|---|---|---|
| 8,782,550 B1* | 7/2014 | Patridge | G06F 3/0488 715/702 |
| 2006/0111890 A1 | 5/2006 | Mowatt | |
| 2009/0044139 A1 | 2/2009 | Shin | |
| 2010/0287486 A1* | 11/2010 | Coddington | G06F 3/0236 715/769 |
| 2011/0035209 A1 | 2/2011 | MacFarlane | |
| 2011/0205160 A1* | 8/2011 | Song | G06F 3/0236 345/168 |
| 2013/0033444 A1 | 2/2013 | Park | |
| 2013/0050089 A1 | 2/2013 | Neels | |
| 2013/0311956 A1 | 11/2013 | Li | |
| 2014/0040733 A1* | 2/2014 | Colley | G06F 3/0237 715/256 |
| 2014/0108989 A1* | 4/2014 | Bi | G06F 3/04886 715/773 |
| 2014/0195985 A1 | 7/2014 | Yoon | |

* cited by examiner

*Primary Examiner* — Keith D Bloomquist
(74) *Attorney, Agent, or Firm* — Shalini Venkatesh

(57) ABSTRACT

A non-transitory program storage device having stored computer instructions that when executed cause one or more programmable control devices to: receive an input signal having at least one character to provide an erroneous string having at least one incorrect character; display the erroneous string having at least one incorrect character; accept an input signal which corresponds to a drag on a virtual keyboard from a key corresponding to an incorrect character on the virtual keyboard to a key corresponding to a corrected input on the virtual keyboard; replace the at least one incorrect character in the erroneous string with the corrected input to provide a corrected character string; and display the corrected character string.

20 Claims, 32 Drawing Sheets

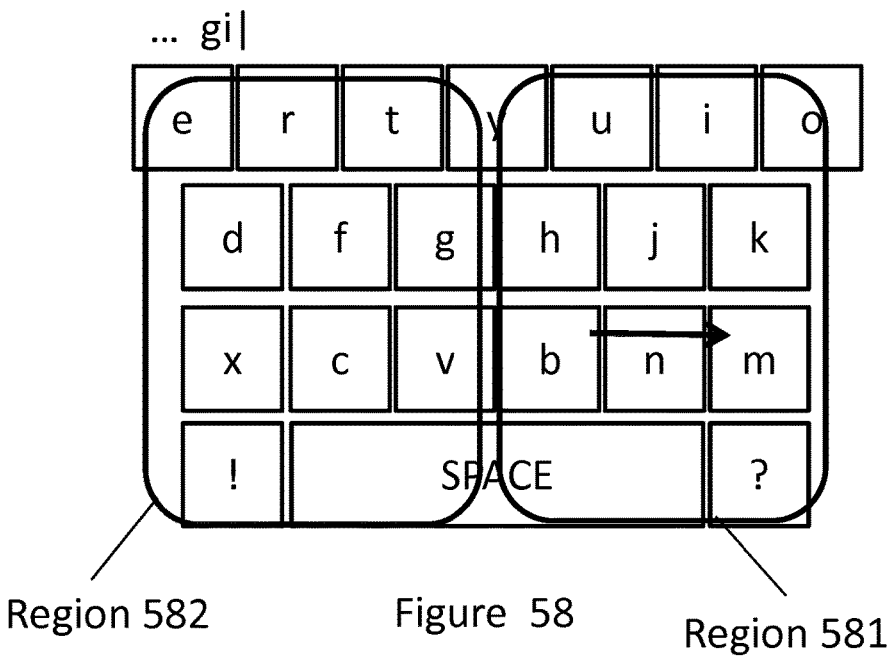
Region 582  Figure 58  Region 581
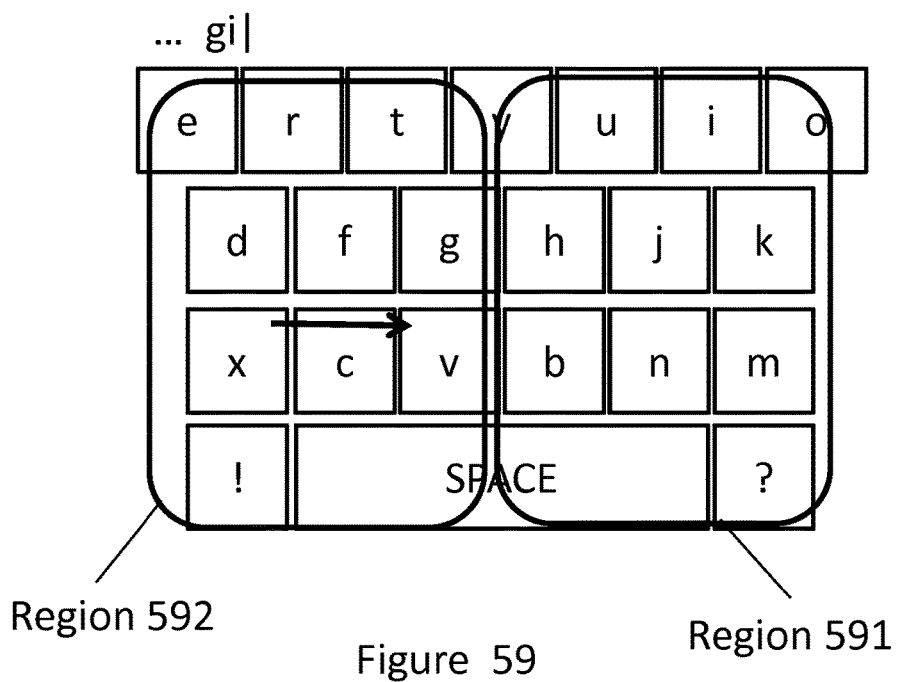
Region 592  Figure 59  Region 591

ADVANCED METHODS AND SYSTEMS FOR TEXT INPUT ERROR CORRECTION

This application claims priority to provisional patent application number U.S. 62/069,740 filed Oct. 28, 2014 and entitled "Methods and systems for text input error correction" and provisional patent application number U.S. 62/209,795 filed Aug. 25, 2015 and entitled "Advanced methods and systems for text input error correction," the entire contents of both of which are incorporated herein by reference.

The present invention generally relates to electronic devices and in particular to operational control of such devices with a touch sensitive screen.

Finding an easier method to input characters into a digital system is a hot topic in the field of computer-human interaction. While for systems such as desktops or laptops, physical keyboards are the accepted solution, for smaller systems such as smart phones, using a large physical keyboard is not practical. Current smart phones use a small physical keyboard with small keys which are not easy to use especially for people with large fingers. Furthermore, the small number of keys in such keyboards means that some characters cannot be entered into the digital system easily. Virtual keyboards are another solution, which have become popular thanks to the progress in manufacturing touch screens, but the number of keys that can be displayed on a touch screen is limited by the small size of the smart phones' screens.

One of the common mistakes when entering text into a device is entering a wrong character, for example by pressing a key adjacent to the intended key when typing on a keyboard. While auto-correction algorithms might correct such mistakes in some cases, there are many cases that auto-correction algorithms cannot correct the errors. As an example, both the intended string of characters and the typed string of characters might correspond to valid words (i.e., they might be in the dictionary), e.g., "dime" and "dome". As another example, none of the strings might be in the dictionary, e.g., "1900" and "1990". Correcting such mistakes typically requires moving the cursor next to the erroneous character, pressing the BACKSPACE key or the DELETE key to erase the erroneous character, entering the correct character and moving the cursor back to its original position. Thus, the user must perform four actions. In particular, the first and the last actions, moving the cursor next to the erroneous character and moving the cursor back to its original position, can be difficult to do on small screen devices such as smart phones and smart watches. The present invention provides a system/method/device for making correction when inputting data in an electronic device. As it would be appreciated by those of skill in the art, the system/method/device may be software performed by a processor of the electronic device.

These and other features, aspects and advantages of the present invention will become better understood with reference to the following description and claims.

SUMMARY OF THE INVENTION

The present invention generally relates to electronic devices and in particular to operational control of such devices with a touch sensitive screen.

According to one aspect of the present invention, a non-transitory program storage device having stored computer instructions that when executed cause one or more programmable control devices to: receive an input signal having at least one character to provide an erroneous string having at least one incorrect character; display the erroneous string having at least one incorrect character; accept an input signal which corresponds to a drag on a virtual keyboard from a key corresponding to an incorrect character on the virtual keyboard to a key corresponding to a corrected input on the virtual keyboard; replace the at least one incorrect character in the erroneous string with the corrected input to provide a corrected character string; and display the corrected character string.

According to other aspects of the present invention, a non-transitory program storage device having stored computer instructions that when executed cause one or more programmable control devices to: receive an input signal having at least one character to provide a string requiring at least one character to be inserted; display the string requiring at least one character to be inserted; accept an input signal which corresponds to a predetermined input received on a keyboard on a key corresponding to a first character of the string, a special key on the virtual keyboard and a second character on the virtual keyboard; insert the second character in the string after the first character to provide a corrected character string; and display the corrected character string.

According to other aspects of the present invention, a non-transitory program storage device having stored computer instructions that when executed cause one or more programmable control devices to: receive an input signal having at least one character to provide an erroneous string having at least one incorrect character; display the erroneous string having at least one incorrect character; accept an input signal which corresponds to a gesture on one of the keys on the virtual keyboard corresponding to one of the incorrect characters; move the placement of the at least one incorrect character in the erroneous string according to the input signal which corresponds to a gesture to provide a corrected character string; and display the corrected character string.

According to other aspects of the present invention, a non-transitory program storage device having stored computer instructions that when executed cause one or more programmable control devices to: receive an input signal in a first level graphical user interface of the non-transitory program storage device requesting additional options for a key; display the first additional options in a first pop-out window in a graphical user interface of the non-transitory program storage device, wherein the first additional options displayed for a key are for first additional characters; accept an input signal which corresponds to a drag on the graphical user interface of the non-transitory program storage device, which directs the first pop-out window to close and a second pop-out window to open, wherein the second pop-out window has second additional options for second additional characters corresponding to a second key, accept an input signal which corresponds to a selected one of the second additional options to provide a selected character; and display the selected character.

According to other aspects of the present invention, a non-transitory program storage device having stored computer instructions that when executed cause one or more programmable control devices to: receive an input signal having at least one character to provide an erroneous string having at least one incorrect character; display the erroneous string having at least one incorrect character; accept at least one input signal on a keyboard which corresponds to a key corresponding to an incorrect character, a key corresponding to a correct character and a change of operation mode to error correction mode; replace the at least one incorrect character in the erroneous string with the corrected character to provide a corrected character string; and display the corrected character string.

According to other aspects of the present invention, a non-transitory program storage device having stored computer instructions that when executed cause one or more programmable control devices to: receive an input signal having at least one character to provide an erroneous string having at least one incorrect character; display the erroneous string having at least one incorrect character on a graphical user interface; accept an input signal which corresponds to a drag on a virtual keyboard; locate an incorrect character according to the location of the cursor on a graphical user interface; determine the corrected input according to the angle of the drag on the virtual keyboard and a slide direction of the drag on the virtual keyboard; replace the incorrect character in the erroneous string with the corrected input to provide a corrected character string; and display the corrected character string.

These and other features, aspects and advantages of the present invention will become better understood with reference to the following description and claims.

BRIEF DESCRIPTION OF THE DRAWINGS

FIGS. 58 and 59 depict multiple regions on a keyboard according to the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
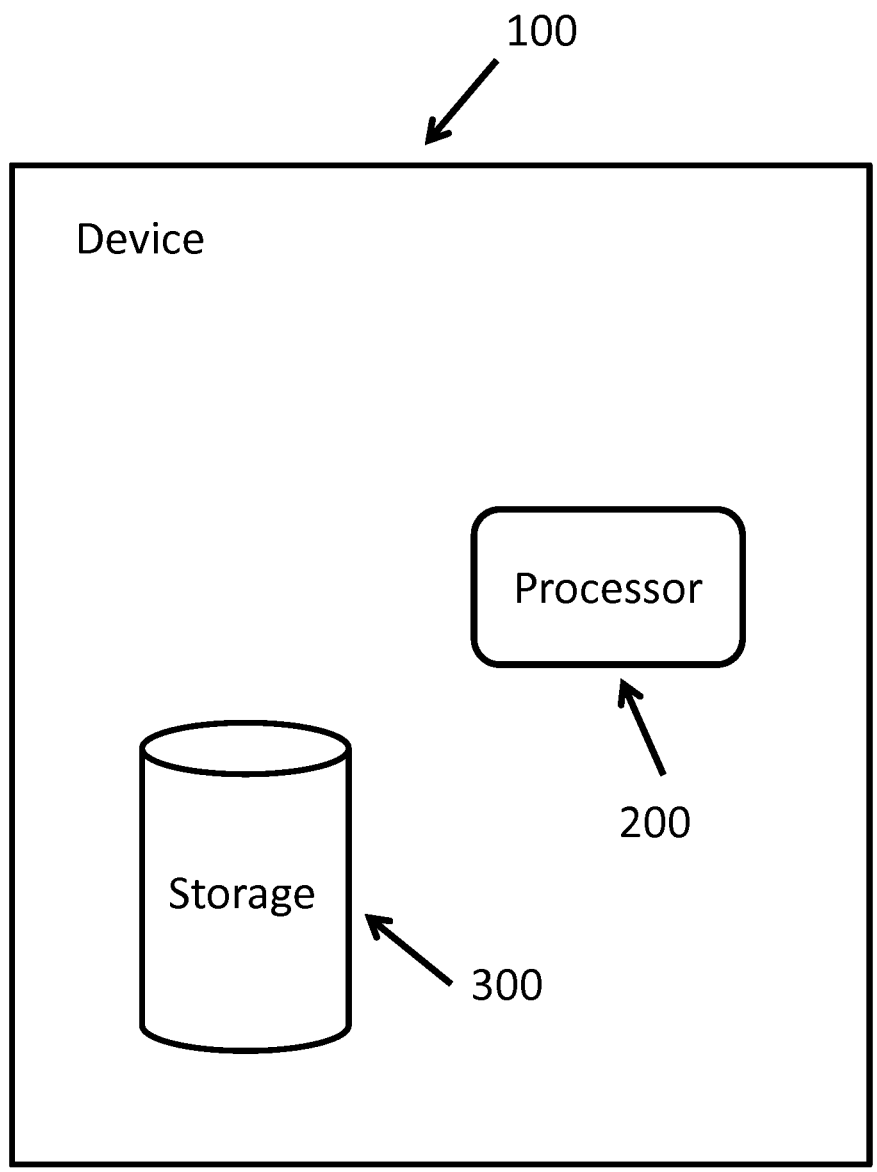
FIG. 1 depicts a computing device according to the present invention.

The present invention provides a system/method/device for making correction when inputting data in an electronic device. As it would be appreciated by those of skill in the art, the system/method/device may be software performed by a processor of the electronic device. Each step of the present invention that requires steps to be performed would be performed by the processor of the electronic device. FIG. 1 depicts a computing device/electronic device (100) with a processor (200) and a storage (300).

Figure 2:
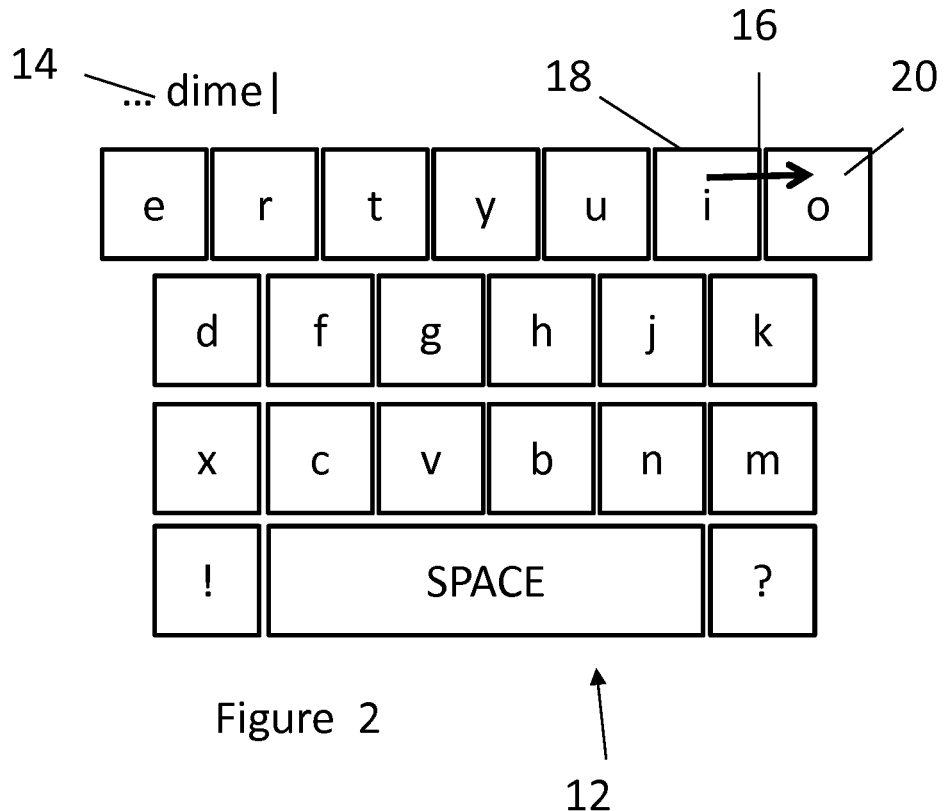
FIG. 2 depicts a virtual keyboard with an erroneous string having at least one incorrect character according to the present invention.
Figure 3:
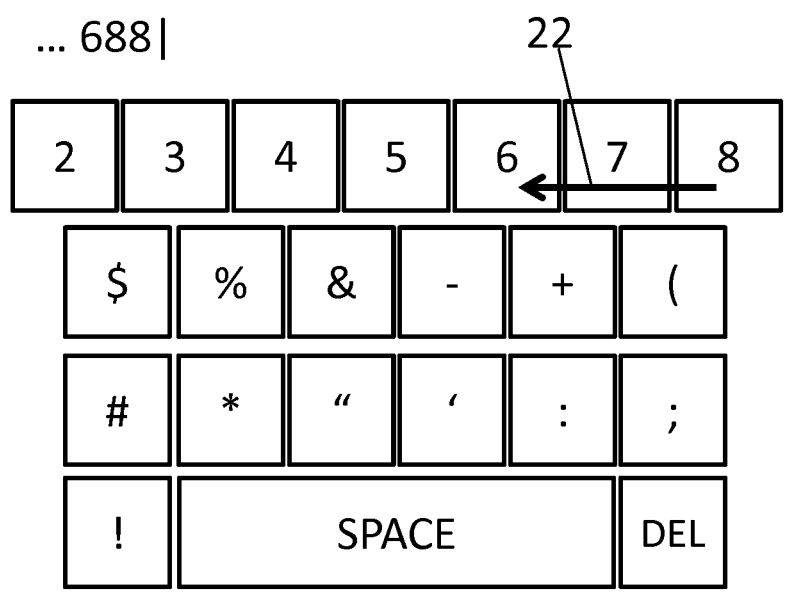
FIG. 3 depicts a virtual keyboard with an erroneous string having at least one incorrect character according to the present invention.

The present invention is a system/method/device for making corrections easily. In some embodiments, the system/method/device has a virtual keyboard. A virtual keyboard is a keyboard on a graphical user interface of a device, such as a smart phone, tablet, smart watch or any computing device, that may have an abbreviated (or fewer) number of keys than a standard QWERTY keyboard. The user selects the erroneous string of characters by putting the cursor in front of the string. The user puts his finger/pointer/stylus on the key corresponding to the erroneous character and drags his finger/pointer/stylus to the key corresponding to the correct character and lifts his finger/pointer/stylus from the screen. The system/method/device searches the selected string and finds the first instance of the erroneous character and replaces it with the correct character (FIGS. 2 and 3). The term "drag" refers to the input signal received when the user starts at one point and maintains contact on the graphical user interface to another point. The terms swipe or gesture may be the same as drag. A gesture though, may be many other things including a drag. Swiping a key or dragging on a key means a user making continuous contact (or providing an input signal) on the graphical user interface in a sliding or sweeping motion on a key. In contrast, pressing a key would just be an input on one key without any sliding or sweeping motion.

According to one aspect of the present invention, as depicted throughout and with reference to FIGS. 2 and 3, a non-transitory program storage device having stored computer instructions that when executed cause one or more programmable control devices to: receive an input signal having at least one character to provide an erroneous string having at least one incorrect character (14); display the erroneous string having at least one incorrect character (14); accept an input signal (16) which corresponds to a predetermined input, such as a drag, received on a virtual keyboard (12) from a key corresponding to an incorrect character (18) on the virtual keyboard to a key corresponding to a corrected input (20) on the virtual keyboard; replace (or alternatively insert a new character or delete) the at least one incorrect character in the erroneous string with the corrected input to provide a corrected character string; and display the corrected character string. It should be understood that the input signal may also correspond to a drag on a virtual keyboard from the at least one corrected input on the virtual keyboard (20) to an incorrect character (18) on the virtual keyboard. In other words, the order may be any order, but is fixed during implementation or is fixed by the user by choosing one of the options. The term "incorrect character" may refer to the key on the virtual keyboard corresponding to the incorrect character. According to another embodiment, the input signal which corresponds to a predetermined input may be received on a keyboard on a key corresponding to a first character of the string, a special key on the virtual keyboard and a second character on the virtual keyboard.

According to yet another embodiment, the input signal may correspond to a gesture on one of the keys on the virtual keyboard corresponding to one of the incorrect characters and the placement of the at least one incorrect character in the erroneous string may be moved according to the input signal which corresponds to a gesture to provide a corrected character string; and the corrected character string is displayed. The term predetermined input may be any input, such as a drag, hold, swipe, multiple swipes, directional movements, predetermined distance drags, predetermined time holds, simultaneously pressing a modifier key, examples may be pressing and holding down the key, swiping a key upward, dragging a finger on the keyboard from one key to another, swiping a key in a direction, swiping a key in a set of directions (for example, up then down, down then up, right then left, left then right, etc.). In some embodiments, a modifier key is pressed simultaneously with one of the incorrect or correct keys (or first or second keys). In some embodiments, the modifier key is one of the ALT key, Ctrl Key, Function key, Command key or Option key.

An error correction mode input may also be required prior to receiving the input signal. The error correction mode input may be a specific button on the virtual keyboard. For example, in FIG. 4, there is an "EC" button (401). The error correction mode input may also be a specific input by a user. A specific input by a user may be a series of buttons, gestures or predetermined inputs.

According to another embodiment, the input signal which corresponds to a predetermined input may be received on a virtual keyboard as at least one incorrect character on the virtual keyboard, a special key on the virtual keyboard then a corrected input on the virtual keyboard. The special key may be any key or series of keys. For example, the special key may be the delete button, space bar, ctrl, alt, etc. The predetermined input may be, for example, a drag on a key, hold, swipe, multiple swipes, directional movements, predetermined distance drags, predetermined time holds or any gesture that may be received as an input on a virtual keyboard.

Figure 11:
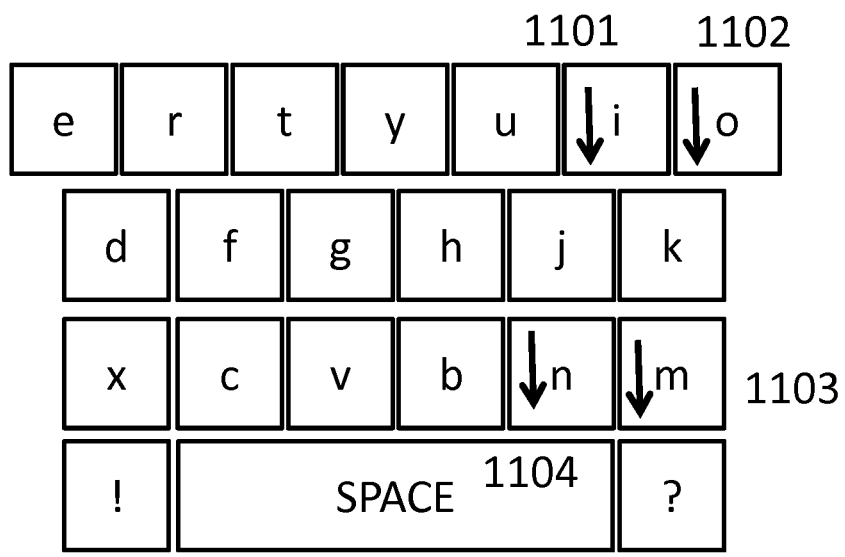
FIG. 11 depicts a manner of accepting an input signal according to the present invention.

In the example depicted in FIG. 2, dime would be displayed as corrected character string dome. In the example depicted in FIG. 3, 688 would be displayed as corrected character string 668, as the first instance of the incorrect character would be replaced with the corrected input. This may be accomplished by dragging from the 8 to the 6, as depicted by arrow (22). The computer instructions, when executed, may cause the corrected input to have the same case as the erroneous or incorrect character. It may also be required that an error correction mode be input prior to receiving the input signal. There may be an "EC" button (401 in FIG. 4). Alternatively, the error correction mode input may be a specific input by a user. For example, instead of indicating the start and the end of the error correction mode, it is possible to use a different text entry device or method (e.g., a second virtual keyboard) in the error correction mode than the one used in the normal operation mode. In some embodiments, the method used for entering characters in the error correction mode is different than the method used for entering characters in the normal mode. In some embodiments, the user uses a gesture based technique (e.g., Swype™) to enter characters in the normal operation mode and presses the keyboard's keys to enter characters in the error correction mode. In some embodiments, one of the two methods used for entering characters is pressing on the keyboard's keys and the other one is performing a gesture on each key whose character must be entered (e.g., dragging a finger upward on the key whose character must be entered). In some embodiments, in the error correction mode, all characters must be entered by dragging a finger on their corresponding keys (i.e., the characters are not entered by pressing the keys) (FIG. 11). In some embodiments, one of the methods is handwriting recognition. In some embodiments, one of the methods is voice recognition. In some embodiments, instead of two different methods, two different instances of the same method are used. In some embodiments, instead of two different methods, two different keyboards are used.

In some embodiments, a string of characters is the characters between two whitespace separators. In some embodiments, the whitespace separators include one or more of SPACE, NEW LINE, and TAB. In some embodiments, the whitespace separators include one or more of SPACE, NEW LINE, TAB, the beginning of the document and the end of the document, comma, exclamation mark, question mark, colon, semicolon, period, parenthesis, square bracket, curly bracket, single quote, and double quote. In some embodiments, a string of characters is a sequence of letters or hyphen or apostrophe between two characters which are not letters, hyphen or apostrophe. In some embodiments, a string of characters is a sequence of letters or hyphen or apostrophe between two whitespace separators. In some embodiments, the whitespace separators include one or more of SPACE, NEW LINE, and TAB. In some embodiments, the whitespace separators include one or more of SPACE, NEW LINE, TAB, the beginning of the document and the end of the document, comma, exclamation mark, question mark, colon, semicolon, period, parenthesis, square bracket, curly bracket, single quote, and double quote.

In some embodiments, the string is selected by putting the cursor immediately after the string. In some embodiments, the string is selected by putting the cursor immediately before the string. In some embodiments, when selecting a string, the whitespace separators between the cursor and the string are ignored (e.g., in "test" the string "test" can be selected by putting the cursor after the SPACE which follows "test"). In some embodiments, the string is selected by putting the cursor on the string. In some embodiments, only the part of the string before the cursor is selected. In some embodiments, only the part of the string after the cursor is selected. In some embodiments, the search for finding the incorrect character is not case sensitive. In some embodiments, the search is case-sensitive. In some embodiments, before replacing the instance of the erroneous character with the correct character, the correct character is changed to have the same case as the instance of the erroneous character.

In some embodiments, the system/method/device has two operation modes. In the first mode, which is the normal operation mode, the characters are entered and displayed on the screen. In the second operation mode, which is the error correction mode, characters are entered to indicate which of the previously entered characters are erroneous and to indicate the correct characters that must replace them.

Selecting text for editing purposes requires performing multiple actions and is time consuming. Selection as it is referred to in this section is, for example, for copying purposes. It is different than selection by putting the cursor after a word. In some embodiments, the user drags his finger from a first letter to a special key and then to a second letter to select the text between the last instance of the second letter before the cursor and the last instance of the first letter preceding the last instance of the second letter. In some embodiments, the special key is the key which can be used to change the keyboard layout. In some embodiments, the selection is inclusive in at least one side. In some embodiments, the selection is not inclusive. In some embodiments, if there are more than one instance of the first letter or the second letter, other options for selecting text are displayed on a raised portion (e.g., a pop out window or the word suggestion bar). For example if "Hello world" is displayed on the screen and the cursor is located immediately after "world" and the user drags his finger from key "l" to the special key and then to key "o", the system selects "lo wo" on the screen and displays "llo wo", "lo" and "llo" as other options for the user to choose. In some embodiments, the user drags his finger from a first letter to a special key and then to a second letter to select the text between the last word, before the cursor, ending with the second letter, and the last word, preceding it, starting with the first letter. In some embodiments, the selection is inclusive. In some embodiments, if there are more than one word starting with the first letter or more than one word ending with the second letter, other options for selecting text are displayed on a raised portion (e.g., a pop out window or the word suggestion bar). For example if "You are young and brave" is displayed on the screen and the cursor is located immediately after the word "brave", and the user drags her finger from key "y" to the special key and then to key "e", the system selects "young and brave" and displays "You are young and brave" and "You are" as other options on a raised portion (e.g., a pop out window or the word suggestion bar). In some embodiments, the order of the first key, the special key and the second key is different.

In some embodiments, an even number of characters are entered in the error correction mode (e.g., 2*n characters, where n is a positive integer) and the system/method/device searches in a string selected by the user, to find the first instance of the (2*i)-th character (entered in the error correction mode) in the selected string and replace it with the (2*i+1)-th character entered in the error correction mode, where $0<=i<n$. In some embodiments, the replacement is performed immediately after (2*i)-th and (2*i+1)-th characters are entered. In some embodiments, all replacements are performed when the error correction mode ends. In some embodiments, instead of replacing the first instance of the character, the last instance of the character is replaced. In some embodiments, the selected string is the string located immediately before the cursor. In some embodiments, the selected string is the string located immediately after the cursor. In some embodiments, the replacement is performed in the string located under the cursor. In some embodiments, the search is not case-sensitive. In some embodiments, the search is case-sensitive. In some embodiments, before replacing the instance of the erroneous character with the correct character, the correct character is changed to have the same case as the instance of the erroneous character.

Figure 4:
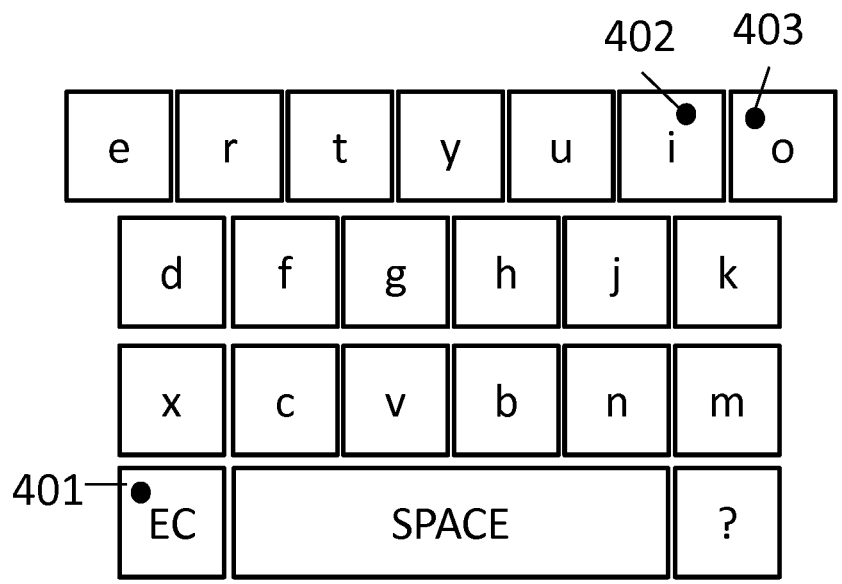
FIG. 4 depicts a virtual keyboard with an error correction mode button according to the present invention.
Figure 5:
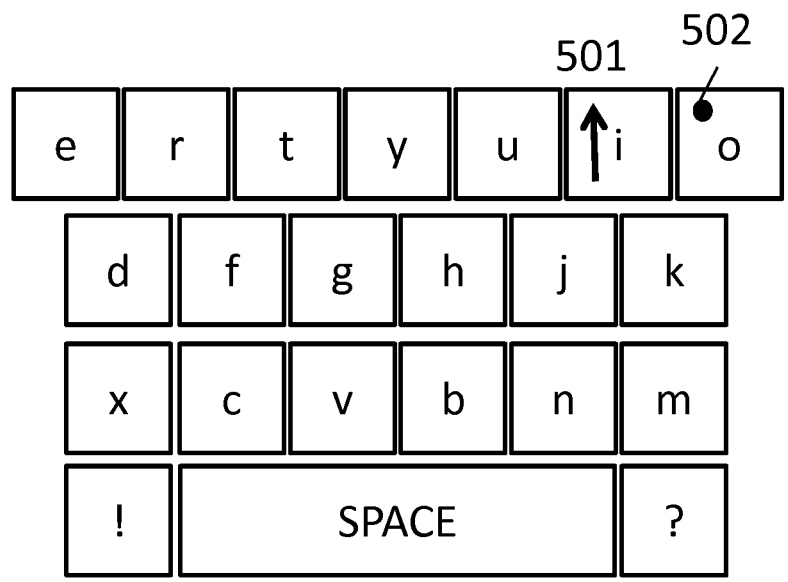
FIG. 5 depicts a virtual keyboard with a predetermined input, a drag, in a direction to start error correction mode and enter a character.
Figure 6:
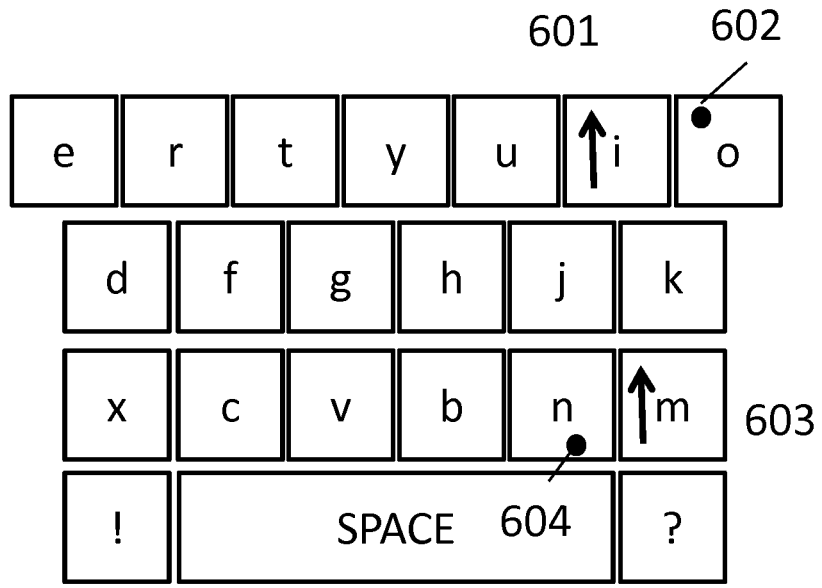
FIG. 6 depicts a virtual keyboard accepting an input signal according to the present invention.

In some embodiments, the start of the error correction mode is indicated by the user pressing a specific key. In FIG. 4, the user presses key (401) labeled "EC" to indicate entering the error correction mode. Then, the user presses keys "i" (402) and "o" (403) to replace character "i" with character "o" in the selected string (not shown). In some embodiments, the start of the error correction mode is indicated by the user dragging his finger on a specific key. In some embodiments, the start of the error correction mode is indicated by the user performing a specific gesture, e.g., a two-finger swipe on a virtual keyboard. In some embodiments, the start of the error correction mode is indicated by the user dragging his finger in a particular direction on the key corresponding to the first character he wants to enter. In FIG. 5, the user wants to replace "i" with "o" in the selected string, he drags his finger upward on the key (501) labeled "i" to both indicate the start of the error correction mode and enter "i" and presses key (502) to enter character "o". In some embodiments, while in the error correction mode, the user can enter only two characters (thus, the system/method/device can calculate when the error correction mode finishes based on the start of the error correction mode). In FIG. 6, the user enters characters "i" and "o". There may be a mixture of input signals. The arrow indicates a directional drag and a dot indicates a standard button press. For example, upward drag on the "i" key (601) followed by pressing the "o" key (602), the "i" is replaced with "o" in the selected string and the error correction mode ends. Then, the user drags his finger upward on key "m" (603) to indicate entering the error correction mode again and to enter character "m". He then presses key "n" (604). This replaces the first instance of character "m" with character "n" in the selected string and ends the error correction mode. In some embodiments, the start of the error correction mode is indicated by putting a finger on a key of a virtual keyboard and starting dragging the finger on the keyboard and the end of the error correction mode is indicated by lifting the finger from the keyboard. The first and the last characters touched are the incorrect and the correct characters, respectively (FIGS. 2 and 3).

Figure 7:
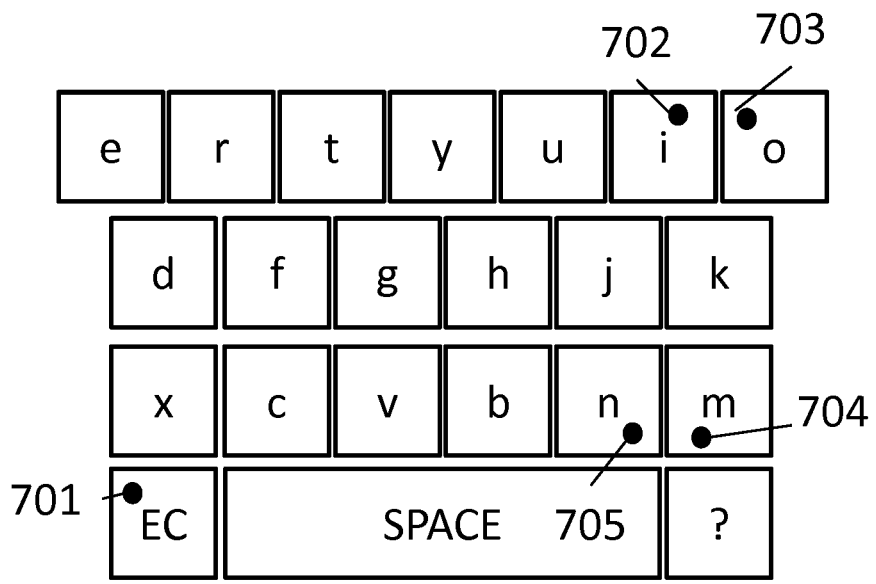
FIG. 7 depicts a virtual keyboard with an error correction mode button according to the present invention.

In some embodiments, the end of the error correction mode is indicated by the user pressing a specific key. In FIG. 7, the user presses the key (701) labeled "EC" to indicate the start of the error correction mode. Then he presses key "i" (702), key "o" (703), key "m" (704), and key "n" (705) and finally presses the key labeled "EC" (701) to indicate the end of the error correction mode. As a result, the selected string, "dime", is converted to "done" (not shown).

Figure 8:
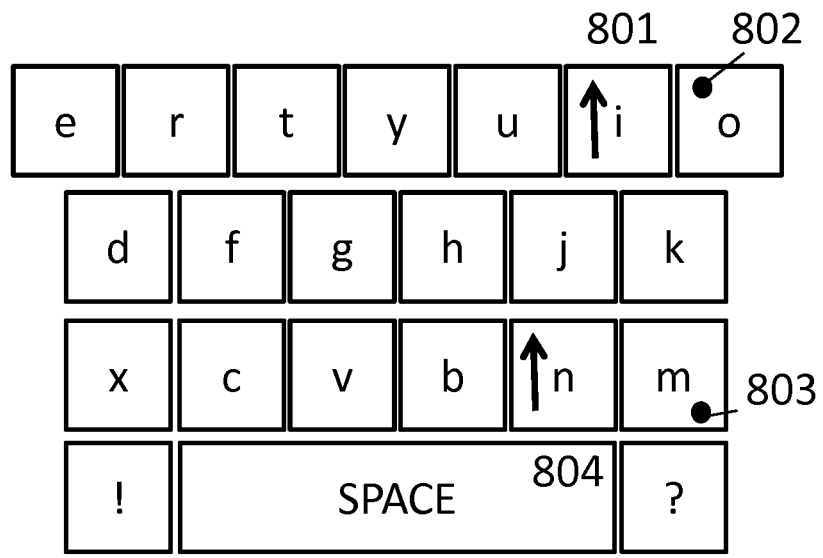
FIGS. 8 and 9 depict a virtual keyboard where an error correction mode is entered by a gesture according to the present invention.
Figure 9:
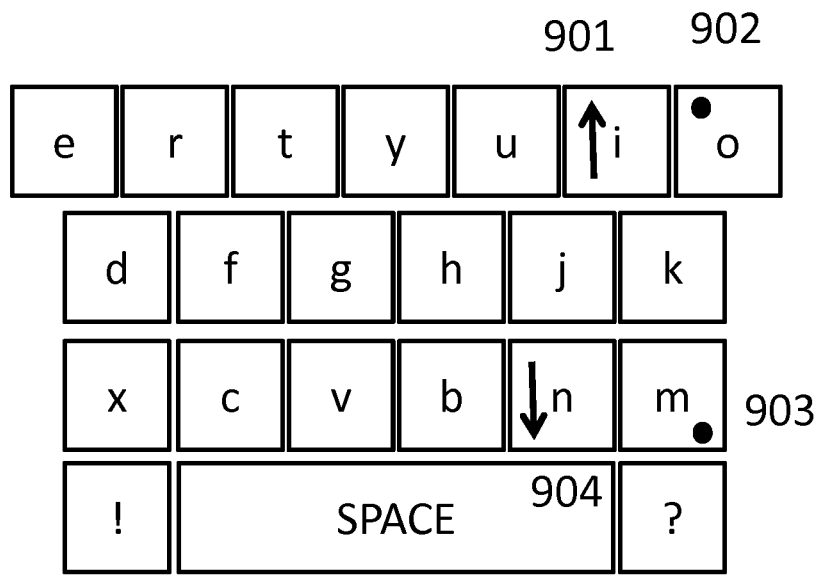

In some embodiments, the end of the error correction mode is indicated by the user dragging his finger on a specific key. In some embodiments, the end of the error correction mode is indicated by the user performing a specific gesture, e.g., a two-finger swipe on a virtual keyboard. In some embodiments, the end of the error correction mode is indicated by the user dragging his finger in a particular direction on a key corresponding to the last character he wants to enter (i.e., if the user wants to replace "m" with "n", he swipes his finger on the key labeled "n" to both indicate entering character "n" and the end of the error correction mode (FIGS. 8 and 9). As shown in FIG. 8, the user presses key "m" (803) and swipes upward key "n" (804). As shown in FIG. 9, the user presses key "m" (903) and swipes downward key "n" (904). The swipe in a direction may also be referred to as a predetermined input or gesture or dragging.

Figure 10:
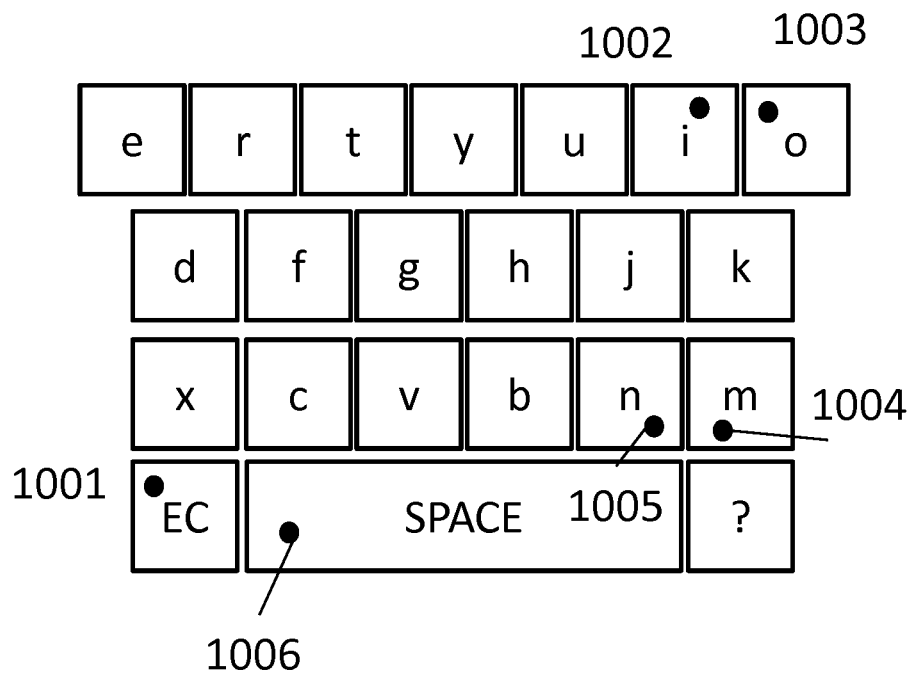
FIG. 10 depicts ending the error correction mode by pressing a special key.

In some embodiments, pressing the SPACE bar indicates the error correction mode has ended. In FIG. 10, the user presses the "EC" key (1001) to enter the error correction mode, then he presses the key "i" (1002) and the key "o" (1003) to replace letter "i" with letter "o" in the string. Then, he presses the key "m" (1004) and the key "n" (1005) to replace the letter "m" with "n" in the string and finally presses the SPACE bar (1006) to end the error correction mode and enter the normal mode of operation. has finished entering characters and presses the SPACE bar. This adds a space after the corrected string and also changes the mode of operation to normal mode.

Instead of indicating the start and the end of the error correction mode, it is possible to use a different text entry method in the error correction mode than the one used in the normal operation mode.

In some embodiments, the method used for entering characters in the error correction mode is different than the method used for entering characters in the normal mode. In some embodiments, the user uses a gesture based technique (e.g., Swype™) to enter characters in the normal operation mode and presses the keyboard's keys to enter characters in the error correction mode. In some embodiments, one of the two methods used for entering characters is pressing on the keyboard's keys and the other one is performing a gesture on each key whose character must be entered (e.g., dragging a finger upward on the key whose character must be entered). In some embodiments, in the error correction mode, all characters must be entered by dragging a finger on their corresponding keys (i.e., the characters are not entered by pressing the keys) (FIG. 11). For example, there may be first a downward swipe (1101) followed by a downward swipe (1102). This may replace i with o. There may next be a downward swipe 1103, followed by a downward swipe (1104) which may replace m with n. In some embodiments, one of the methods is handwriting recognition. In some embodiments, one of the methods is voice recognition. In some embodiments, instead of two different methods, two different instances of the same method are used. In some embodiments, instead of two different methods, two different keyboards are used.

In some embodiments, if there are n instances of the first character in the selected string, where n is an integer greater than 1, the system/method/device creates n different strings, each corresponding to replacing one of the instances of the first character with the second character and the system/method/device displays them on the screen and asks the user to select one of them to replace the selected string. In some embodiments, the system/method/device displays the strings after the user lifts his finger from the screen. An additional input on a portion of the virtual keyboard may trigger additional options for corrected input. For example, the present invention may display the strings after the user has held his finger on the key corresponding to the second character for longer than a threshold time. The additional options for corrected input may correspond to the location of the additional input on a portion of the virtual keyboard.

Figure 12:
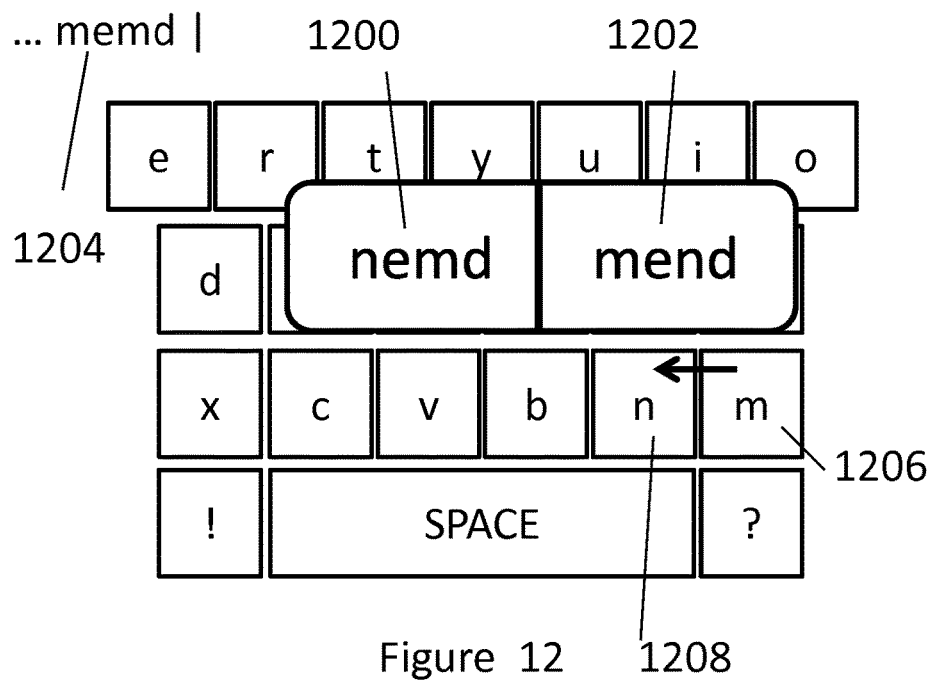
FIG. 12 depicts at least two corrected input choices on a raised portion of the virtual keyboard according to the present invention.

In some embodiments, the multiple choices are offered by popping up a list on the screen (FIG. 12). As shown in FIG. 12, the programmable control device received an input signal having at least one character (e.g. memd (1204)) to provide an erroneous string having at least one incorrect character. The programmable control device may accept an input signal which corresponds to a drag on a virtual keyboard from the at least one incorrect character (e.g. key "m" (1206)) on the virtual keyboard to a corrected input ((e.g. key "n" (1208)) on the virtual keyboard.

There may be computer instructions that when executed cause the one or more programmable control devices to display at least one corrected input choice (e.g. 1200, 1202) on a raised portion (a pop-up, pop-out window) of the virtual keyboard and in response to accepting input corresponding to one chosen corrected input choice from the at least one corrected input choices on a raised portion replaces at least a portion of the corrected character string with the one chosen corrected input choice to provide a second corrected character string; and displays the second corrected character string instead of the corrected character string. The at least one corrected input choice on a raised portion of the virtual keyboard may be determined based on spell check, autocorrection and word prediction computer instructions. The term "raised portion" is intended to mean it appears to be on top of or overlay the virtual keyboard. In some embodiments, one of the at least one corrected input choices on a raised portion of the virtual keyboard may be for a word that occurs prior to the word before the cursor.

In some embodiments, if there are multiple choices, one of them is selected automatically and replaces the selected string. Other choices are displayed on the screen. If the user selects one of the choices, that choice replaces the automatically selected string. If the user presses one of the keys of the keyboard or moves the cursor or if the user does not press any of the choices within a period of time, the choices offered are erased from the screen.

In some embodiments, the second key is the DELETE key or the BACKSPACE key and the instance of the character corresponding to the first key is replaced with an empty string or null character (i.e., the instance of the character is deleted). In some embodiments, if the selected string is a word and its first letter, which is capitalized, is deleted, the first letter of the new string is capitalized.

Figure 13:
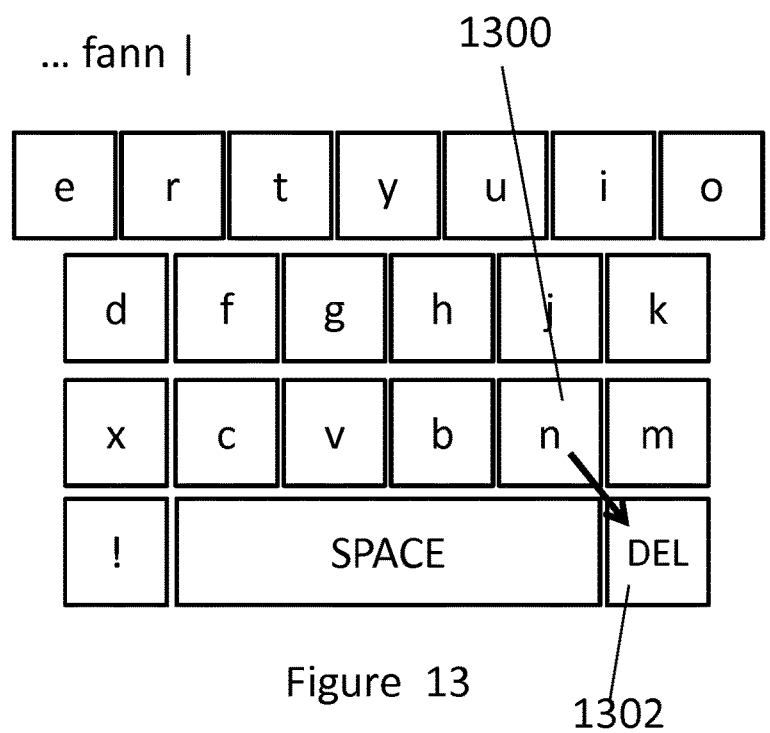
FIG. 13 depicts deleting an incorrect character according to the present invention.

In some embodiments, if there are n instances of the first character in the selected string, where n is an integer greater than 1, the system/method/device creates n different strings, each corresponding to deleting one of the instances of the first character and the system/method/device removes duplicates. If after removing duplicates, only one string remains, the system/method/device replaces the selected string with the remaining string. Otherwise, the system/method/device displays them on the screen and asks the user to select one of them to replace the selected string. In some embodiments, the multiple choices are offered by popping up a list on the screen. In FIG. 13, the user indicates he wants to delete character "n" in "fann" by pressing key "n" (1300) and swiping or dragging to key "Del" (1302). Since "n" appears twice in "fann", there are two options: 1—deleting the third character, or 2—deleting the fourth character. Since both of these options result in string "fan", the system/method/device does not show these two options to the user and proceeds with changing "fann" to "fan". In some embodiments, if there are multiple choices, one of them is selected automatically and replaces the selected string. Other choices are displayed on the screen. If the user selects one of the choices, that choice replaces the automatically selected string. If the user presses one of the keys of the keyboard or moves the cursor or if the user does not press any of the choices within a period of time, the choices offered are erased from the screen.

In some embodiments, the second key is the SHIFT key and the case of the instance of the character corresponding to the first key is changed. In some embodiments, the first key is the SHIFT key and the case of the instance of the character corresponding to the second key is changed. In some embodiments, the first key is the SPACE bar and the character corresponding to the second key is inserted at the beginning of the selected string. In some embodiments, if the selected string is a word and its first letter is capitalized, while its other letters are in lowercase, the inserted letter is capitalized and the letter after it is changed to lowercase. In some embodiments, if the selected string is a word and all its letters are capitalized, the inserted letter is capitalized. In some embodiments, if the selected string is a word and all its letters are lowercase, the inserted letter is changed to lowercase.

Figure 14:
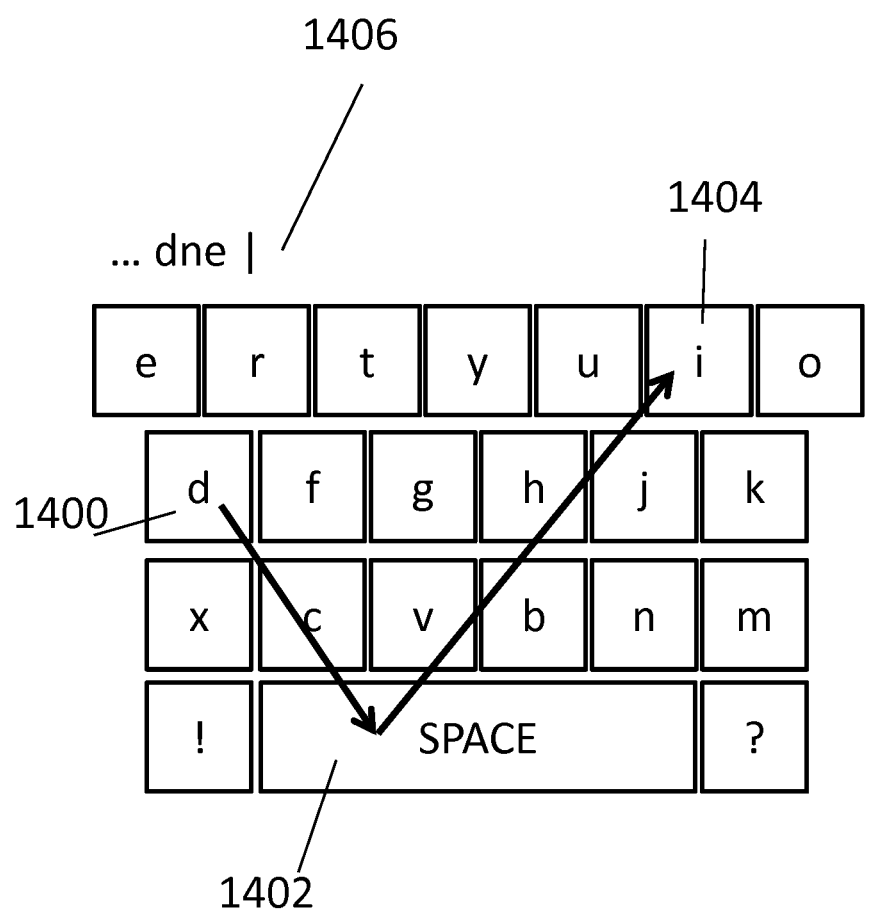
FIG. 14 depicts inserting a character in the erroneous string to provide a corrected character string.

A non-transitory program storage device having stored computer instructions that when executed cause one or more programmable control devices to: receive an input signal having at least one character to provide a string requiring at least one character to be inserted; display the string requiring at least one character to be inserted; accept an input signal which corresponds to at least one predetermined input received on a keyboard on a key corresponding to a first character of the string, a special key on the virtual keyboard and a second character on the virtual keyboard; insert the second character in the string after the first character to provide a corrected character string; and display the corrected character string. In some embodiments, the user enters three characters, where the second character is a special key on the keyboard and the system/method/device inserts the third character after the instance of the first character in the selected string. In some embodiments, the special key is the SPACE key and the predetermined input is a gesture different than pressing the key. In some embodiments, entering three characters is done by putting a finger on the first key and dragging the finger to the special key. Then, dragging the finger to the third key and releasing the key. In FIG. 14, the user puts his finger on key "d" (1400) and moves his finger to the SPACE key (1402). Then, he moves his finger to key "i" (1404) and releases key "i". As a result, the system will insert character "i" after character "d" in the selected string, "dne" (1406) to provide corrected character string "dine." There may be computer instructions that when executed cause the one or more programmable control devices to cause the inserted character to have the same case as the first character.

In some embodiments, the first key is a special key and the last instance of the character corresponding to the second key and all the characters after it in the selected string is deleted. In some embodiments, the first key is a special key and the first instance of the character corresponding to the second key and all the characters after it in the selected string is deleted. In some embodiments, the first key is a special key and the first instance of the character corresponding to the second key and all the characters before it in the selected string is deleted. In some embodiments, the first key is a special key and the last instance of the character corresponding to the second key and all the characters before it in the selected string is deleted. In some embodiments, the instance of the character, itself, is not deleted. In some embodiments, the instance of the character, itself, is not deleted unless this results in no character being deleted. In some embodiments, after the user performs the action, he is offered some strings created based on the above rules so he can select one of them. In some embodiments, the special key is the DELETE key or the BACKSPACE key. In some embodiments, the special key is entered after entering the key corresponding to a character (i.e., the special key is the second key).

Figure 15:
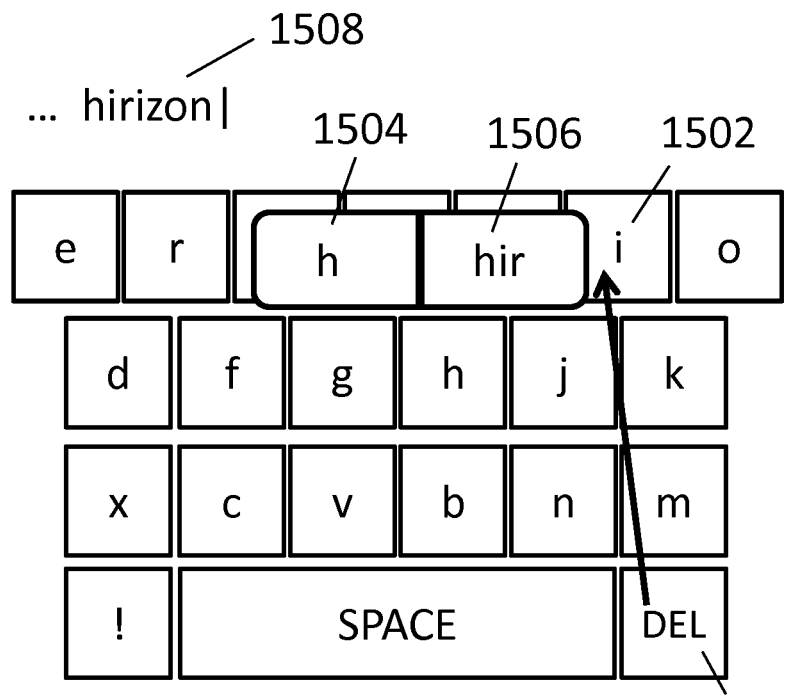
FIG. 15 depicts at least two corrected input choices on a raised portion of the virtual keyboard according to the present invention.

In FIG. 15, the user has dragged his finger from the DELETE key (1500) to key "i" (1502). The selected string, "hirizon" (1508), has two instances of "i". Thus, the system/method/device generates two strings and displays at least two corrected input choices (1504 and 1506) on a raised portion of the virtual keyboard. The first string is generated by deleting the first instance of "i" and all the letters after it. The second string is generated by deleting the second instance of "i" and all the letters after it. The system/method/device displays these two strings to the user so he can choose one of them, for example, by tapping on the string, or reject both of them, for example, by tapping outside the pop out window. In some embodiments, if there are multiple choices, one of them is selected automatically and replaces the selected string. Other choices are displayed on the screen. If the user selects one of the choices, that choice replaces the automatically selected string. If the user presses one of the keys of the keyboard or moves the cursor or if the user does not press any of the choices within a period of time, the choices offered are erased from the screen.

Figure 16:
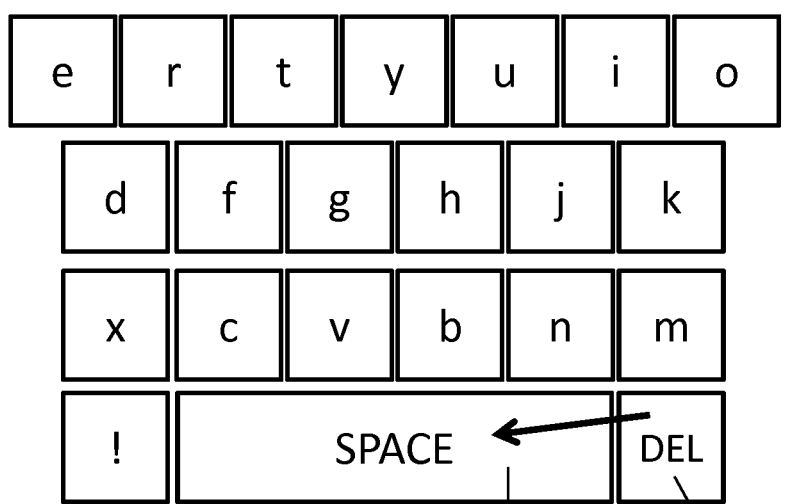
FIG. 16 depicts the use of a special key according to the present invention.

In some embodiments, the first key is the DELETE key (1600) (or any special key including, for example, the BACKSPACE key) and the second key is the SPACE key (1602) and the entire selected string is deleted (FIG. 16). In some embodiments, if the user holds his finger on the SPACE key longer than a threshold time, the user is offered to delete multiple words. They may be displayed on a raised portion of the virtual keyboard.

In some embodiments, the user enters a first character and a second character in the error correction mode. If the selected string is a word (it might be a correct word or an incorrect word), and the first character appears in the selected word n times, where n is a positive integer, the system/method/device takes the selected string and replaces the i-th instance of the first character ($0<=i<n$), located at position pos[i] in the string, where $0<=pos[i]<length$ of the string, with the second character to create new_string[i]. Then, the system/method/device finds all the words, that have already been suggested by the auto-correction and/or auto-prediction algorithms, which have the same characters in the first pos[i]+1 positions as the new_string[i] does. These words and the new_string[i], where 0<=i<n, are displayed so the user can select one of them to replace the old string. In some embodiments, when searching the selected string the case of letters are ignored. In some embodiments, the auto-correction and/or auto-prediction algorithms are executed again or a dictionary is searched, to find the words which have the same characters in the first pos[i]+1 positions as the new_string[i] does, where 0<=i<n. In some embodiments, when finding the words, only the ones which are at least as long as the original string (word) are considered. In some embodiments, when finding the words, only the ones which have exactly the same length as the original string (word) are considered.

Figure 17:
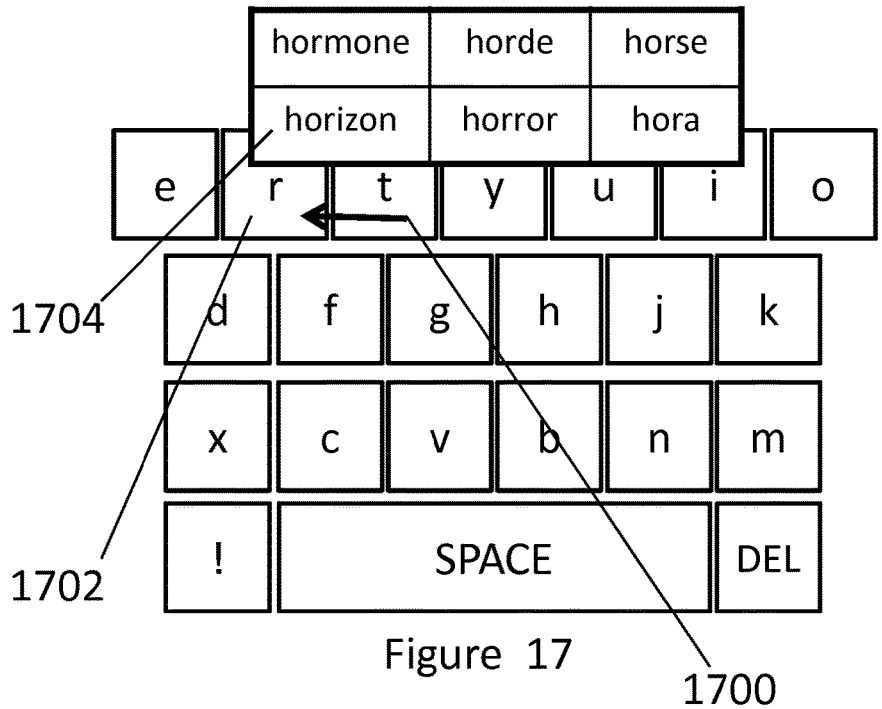
FIG. 17 depicts at least two corrected input choices on a raised portion of the virtual keyboard according to the present invention.

In FIG. 17, the user has dragged his finger from key "t" (1700) to key "r" (1702). If the user lifts his finger from key "r" or if the user holds his finger on key "r" for longer than a threshold time, the system/method/device copies the selected string, "hotizon", and replaces "t" with "r" to create string "horizon" (1704). It also finds the words that start with "hor" and shows them alongside "horizon" to the user to select one of them and replace the selected string with it.

In some embodiments, the system/method/device uses an auto-correction and/or a word-prediction algorithm to suggest words to the user. In some embodiments, as the user types, the system/method/device suggests words and indicates one of the words as auto-correction candidate. If the user presses the SPACE key, the system/method/device replaces the word being composed with the indicated word. In some embodiments, if the user has used this invention to change one or more of the characters in the word being composed or to insert one or more characters in the word being composed or to delete one or more of the characters in the word being composed, the system/method/device doesn't replace the word being composed with the auto-correction candidate if the user presses the SPACE key immediately after performing the change. In some embodiments, the auto-correction candidate is the candidate suggested based on the composed word after the change has been made. In some embodiments, the auto-correction candidate is the candidate suggested based on the composed word before the change was made.

In some cases, it might be difficult for a user to enter both the first character and the second character. For example, when a user is typing with two fingers on a virtual keyboard of a smart phone, it may not be easy for the user to drag his finger from the first key to the second key to enter the first and the second characters. In some embodiments, if the selected string is a word (it might be a correct or an incorrect word), the user enters the first character only. If the first character appears in the selected string n times, in positions pos[i] in the string, where n is a positive integer, 0<=i<n and 0<=pos[i]<length of the string, the system/method/device finds some of the words that have already been suggested by the auto-correction and/or the auto-prediction algorithms, which have the same characters in the first pos[i] positions as the selected string does, but they have a different character in the pos[i] position than the selected string does (for example, if pos[i] is 3, the suggested words will have the same characters as the selected word in positions 0, 1, and 2, but they will have a different character in position 3). These words are displayed so the user can select one to replace the old string. In some embodiments, when searching the selected string, the cases of letters are ignored. In some embodiments, the auto-correction and/or auto-prediction algorithms are called again or a dictionary is searched, to find some words which have the same characters in the first pos[i] positions as the selected string does, but have a different character than the selected string does in position pos[i], where 0<=i<n. In some embodiments, when finding the words, only the ones which are at least as long as the original string (word) are considered. In some embodiments, when finding the words, only the ones which have exactly the same length as the original string (word) are considered. In some embodiments, entering the first character is done by dragging a finger downward on a key. In some embodiments, entering the first character is done by pressing a key for longer than a threshold time.

Figure 18:
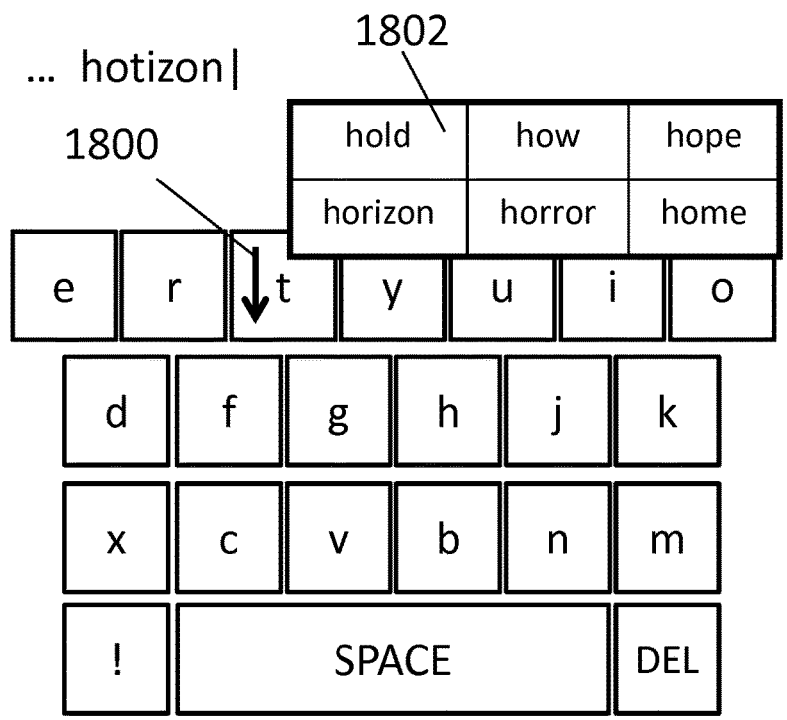
FIG. 18 depicts at least two corrected input choices on a raised portion of the virtual keyboard according to the present invention.

In FIG. 18, the user has dragged his finger on key "t" (1800) indicating that character "t" in the selected string, "hotizon" is wrong. Thus, the system/method/device displays some words which start with "ho", but have a different third character than "t" (1802).

In some cases a user enters the correct characters but in the wrong order. For example, when a user uses two fingers to type on a smart phone's virtual keyboard, he may enter "rasp" instead of "raps". Since both words exist in the dictionary used by the spell checker, the spell checker may not detect the error. As another example, a user may enter "272" when he wants to enter "227".

In some embodiments, the user indicates a character and the system/method/device swaps an instance of the character in the selected string with the character after it. In some embodiments, the user puts his finger on a key and moves his finger to one direction and then he moves his finger back to the original position to indicate that an instance of the character, corresponding to the key, in the selected string should be swapped with the character after it. In some embodiments, if there are multiple instances of the character, indicated by the user, in the selected string, the system/method/device displays several strings to the user, each string constructed by swapping one of the instances of the character, indicated by the user, in the selected string with the character after it. The user can select one of the strings to replace the selected string.

Figure 19:
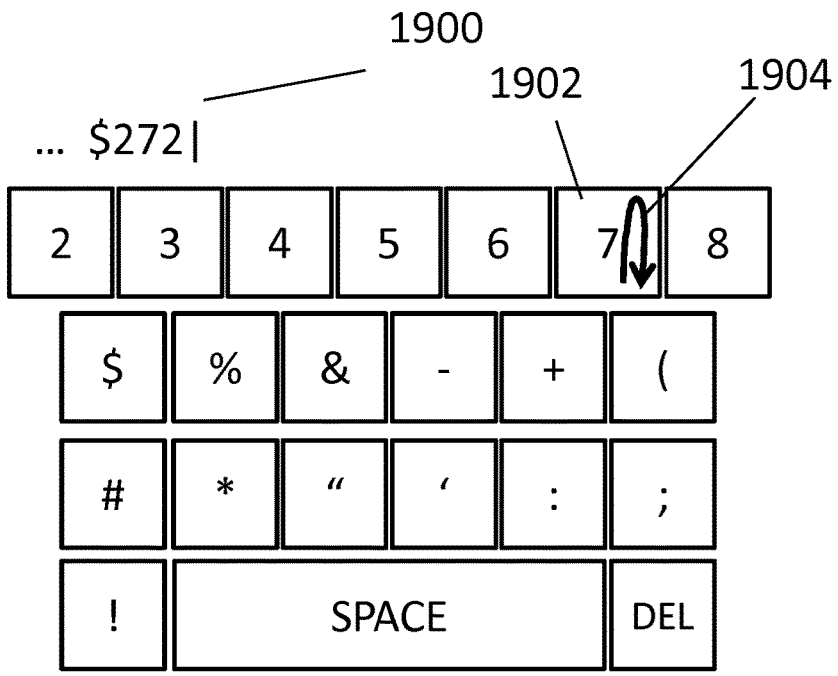
FIGS. 19-21 depict examples of predetermined inputs on a virtual keyboard to provide a corrected character string.

In FIG. 19, the user has entered "$272" (1900). Then, he has put his finger on key "7" (1902), has dragged his finger upward and then downward to the initial position (1904). Thus, the system will swap character "7" with the character after it.

Figure 20:
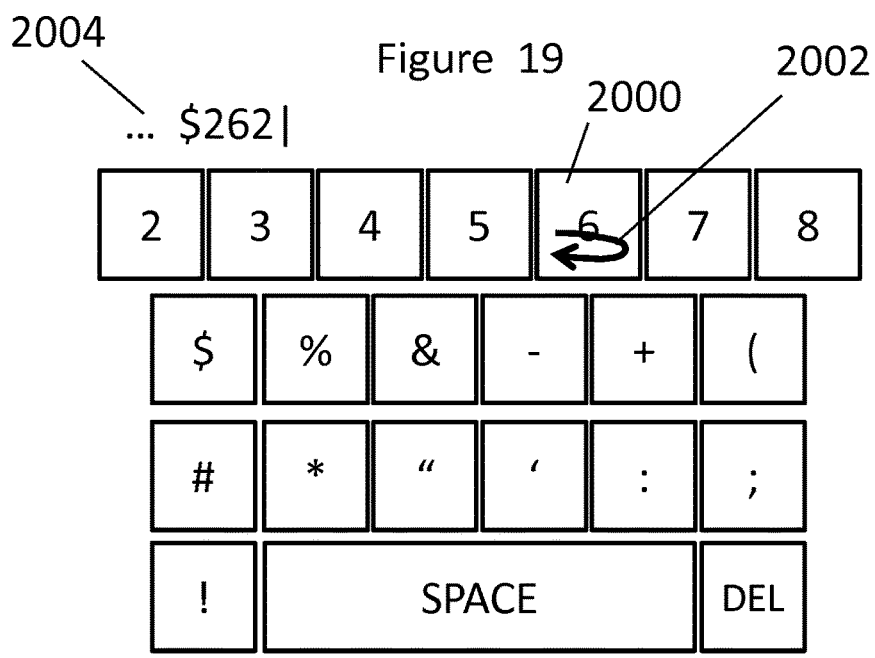
Figure 21:
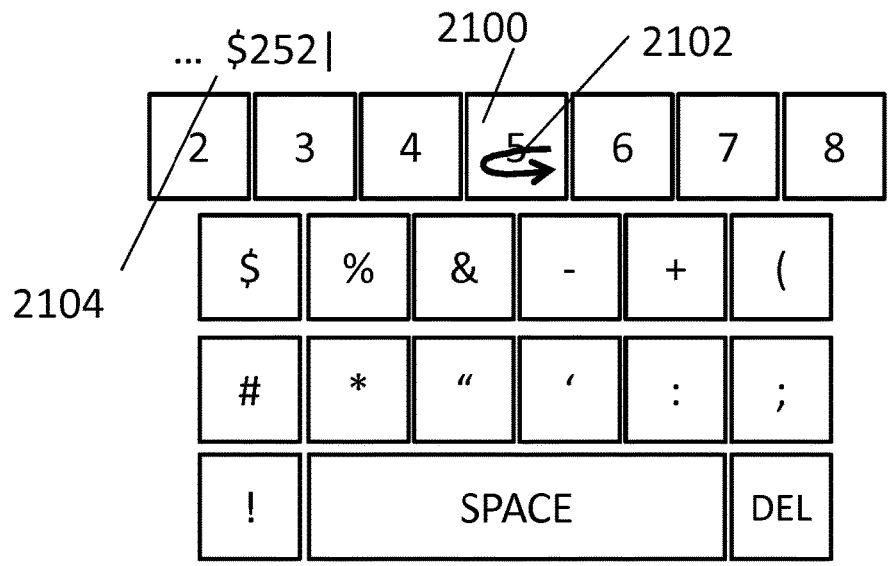

In some embodiments, the character is swapped with the character before it. In some embodiments, the user indicates the character that must be swapped by pressing the key corresponding to the character that must be swapped and dragging his finger to the area outside the key and dragging his finger back. In some embodiments, a special key is pressed, before pressing the key corresponding to the character that must be swapped, to indicate that the character must be swapped. In some embodiments, a special key is pressed, after pressing the key corresponding to the character that must be swapped, to indicate that the character must be swapped. In some embodiments, a special key is pressed, together with pressing the key corresponding to the character that must be swapped, to indicate that the character must be swapped. In some embodiments, if the user puts his finger on a key and moves his finger right and then he moves his finger back to the original position an instance of the character, corresponding to the key, in the selected string would be swapped with the character after it. In some embodiments, if the user puts his finger on a key and moves his finger left and then moves his finger back to the original position an instance of the character, corresponding to the key, in the selected string would be swapped with the character before it (FIGS. 20 and 21). For example, in FIG.

20, an input signal which corresponds to a predetermined input (a right direction then left direction swipe (2002)) received on a virtual keyboard on the at least one incorrect character (key 6 (2000)) results in the erroneous string (2004) having at least one incorrect character being swapped with the character after it. In this example, erroneous string (2004) is changed from $262 to $226. FIG. 21 depicts, an input signal which corresponds to a predetermined input (a left direction then right direction swipe (2102)) received on a virtual keyboard on the at least one incorrect character (key 5 (2100)) results in the erroneous string (2104) having at least one incorrect character being swapped with the character before it. In this example, erroneous string (2004) is changed from $252 to $522. In some embodiments, for each instance of the character, indicated by the user, in the selected string, the system/method/device constructs two strings, one by swapping the instance of the character in the selected string with the character after it and one by swapping the instance of the character in the selected string with the character before it. All strings may be displayed on the screen so the user can select one of the strings to replace the selected string.

In some embodiments, if the character that must be swapped is a SPACE, the first character of the selected string is swapped with the SPACE before the string. As an example, if the user has entered "smar tkeyboard", and the cursor is after "tkeyboard" and the user puts his finger on the SPACE BAR and drags his finger to outside of the SPACE BAR and drags his finger back to the inside of the SPACE BAR, the SPACE before "tkeyboard" and "t" are swapped and the words are changed to "smart keyboard". In some embodiments, if the selected string's first letter is capitalized, its first letter is capitalized after swapping is performed. In some embodiments, if there is only one SPACE between the selected string and the string before it, and the string before it is a word, and the character which is swapped with SPACE is a letter, the letter is changed to have the same case as the case of the word's last letter before swapping.

Controlling cursor can be difficult and time consuming in some devices such as smart phones and smart watches. In some embodiments, the user selects a string. Then, he indicates he wants to put the cursor after the instance of a character in the string. The system/method/device puts the cursor after the instance of the character in the selected string. In some embodiments, there is a keyboard and the user indicates the intended character and the fact that he wants to move the cursor, by pressing the keyboard's key corresponding to the character and a specific key on the keyboard. In some embodiments, the system/method/device has a virtual keyboard, and the user indicates the intended character and the fact that he wants to move the cursor, by putting his finger on the keyboard's key corresponding to the character and dragging his finger from the key to the ENTER key and then releasing the ENTER key. In some embodiment, instead of the ENTER key, a special key is used. In some embodiments, the user holds his finger on the key corresponding to the character for a period longer than a threshold to indicate, he wants to move the cursor to the location after the character. In some embodiments, the system/method/device puts the cursor before the character. In some embodiments, if there is more than one instance of the character in the selected string, the system/method/device displays multiple options to the user and the user selects one of them. In some embodiments, if there is more than one instance of the character in the selected string, the system/method/device puts the cursor after the first instance of the character in the selected string and displays other options to the user. If the user selects one of the other options, the system/method/device moves the cursor accordingly. If the user presses a key on the keyboard, the system/method/device erases the options. If the user doesn't select one of the options within a period of time, the system/method/device erases the options. In some embodiments, the system/method/device puts the cursor right before the instance of the character in the selected string. In some embodiments, the selected string is the string before the cursor. In some embodiments, the selected string is after the cursor. In some embodiments, the selected string is under the cursor. In some embodiments, the system/method/device has a virtual keyboard and the user indicates the intended character and the fact that he wants to move the cursor, by putting his finger on the ENTER key and dragging his finger to the keyboard's key corresponding to the intended character and then releasing the key. In some embodiment, instead of the ENTER key, a special key is used.

Figure 22:
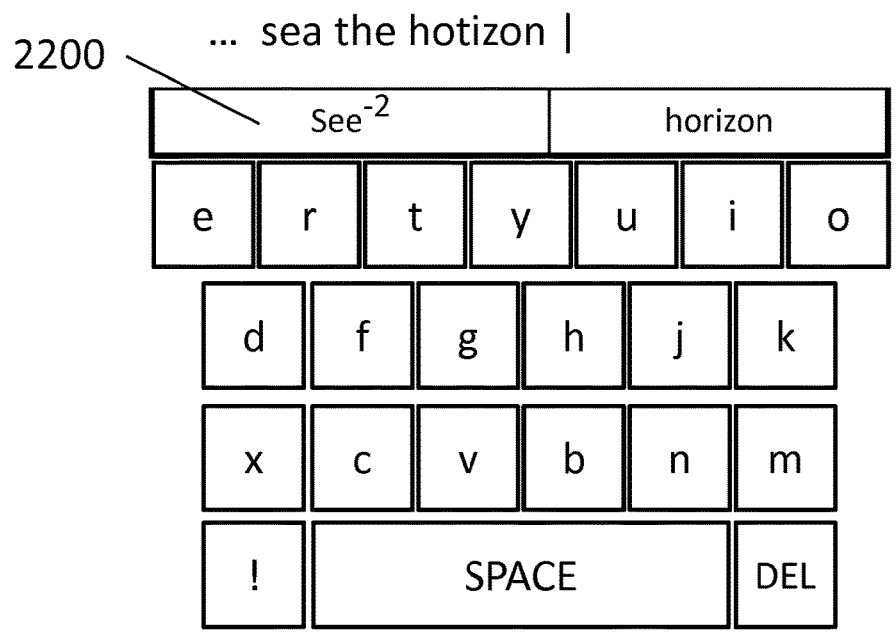
FIG. 22 depicts a superscript indicator according to the present invention.

In some embodiments, the system/method/device displays the auto-correct options for the words which have already been entered so the user can replace the words if necessary. This allows easily correcting a mistake even if the user notices the mistake after entering a few other words. In FIG. 22, the user has entered several words. The system/method/device has suggested a word to replace the current word being composed (i.e., "hotizon") as well as a word to replace one of the previously entered words (i.e., "sea"). One of the at least two corrected input choices on a raised portion of the virtual keyboard may be for a word that occurs prior to the word before the current location of the cursor (i.e., the word being composed or edited) and a superscript indicator is further displayed on the corrected input choice on a raised portion of the virtual keyboard. The system/method/device may put a superscript indicator (2200) (i.e., −2) for the "see" to indicate that this suggestion is for the word located two words before the word being composed. In some embodiments, different font colors are used to differentiate between a word suggested to replace the word currently being composed and a word suggested to replace one of the other words (already entered). In some embodiments, the same font color is used for a suggested word and the word it is going to replace. In some embodiments, different fonts are used to differentiate between a word suggested to replace the word currently being composed and a word suggested to replace one of the other words (already entered). In some embodiments, the same font is used for a suggested word and the word it is going to replace. In some embodiments, different emphasis (e.g., underline, bold, background color) are used to differentiate between a word suggested to replace the word currently being composed and a word suggested to replace one of the other words (already entered). In some embodiments, the same emphasis (e.g., underline, bold, background color) is used for a suggested word and the word it is going to replace. In some embodiments, in addition to the main character displayed on a key of a keyboard, one or more other characters (extra characters) may be associated with the key. An additional input on a portion of the virtual keyboard may trigger additional options for corrected input. The additional input may be, for example, receiving input indicative of a key being pressed more than a threshold time on a portion of the virtual keyboard or receiving input that a gesture has been performed on a portion of the virtual keyboard. The key corresponding to the corrected input on the virtual keyboard may be a shift key and the at least one incorrect character in the erroneous string is replaced with the same character with a different case. The key corresponding to the corrected input on the virtual keyboard may be a delete key and the at least one incorrect character in the erroneous string is replaced with a null corrected character. This is to say it is not actually replaced with a character, but is deleted. For example, the user may drag his finger from "K" to DELETE and this deletes the character "K" from the string.

Figure 23:
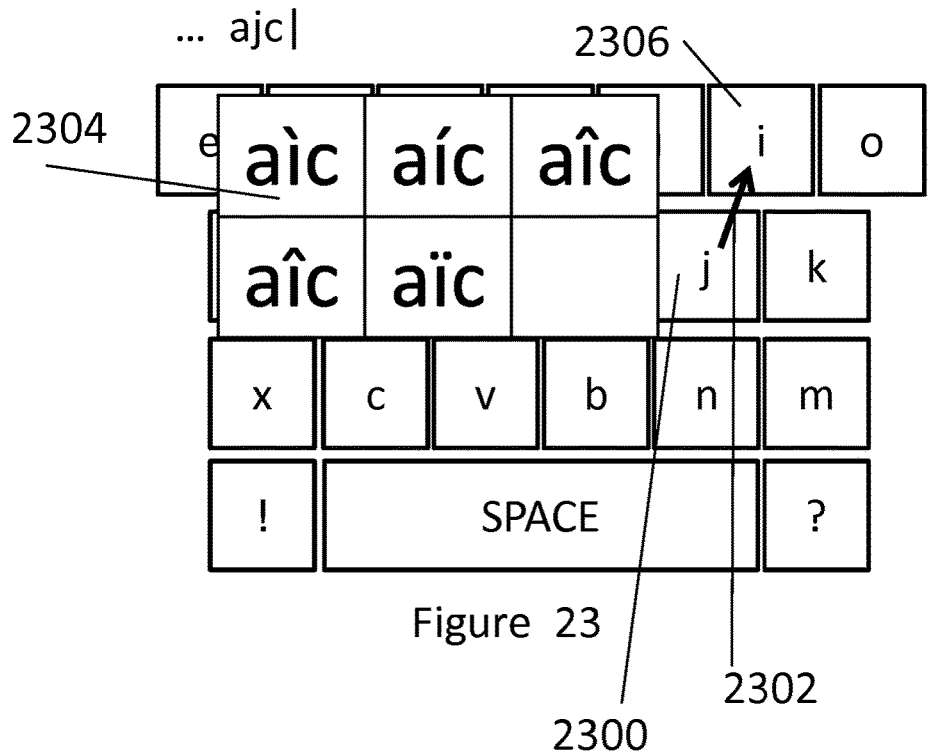
FIGS. 23-28 depict at least one additional option on a raised portion of the virtual keyboard, with some corrected input choices having extra characters, according to the present invention.
Figure 24:
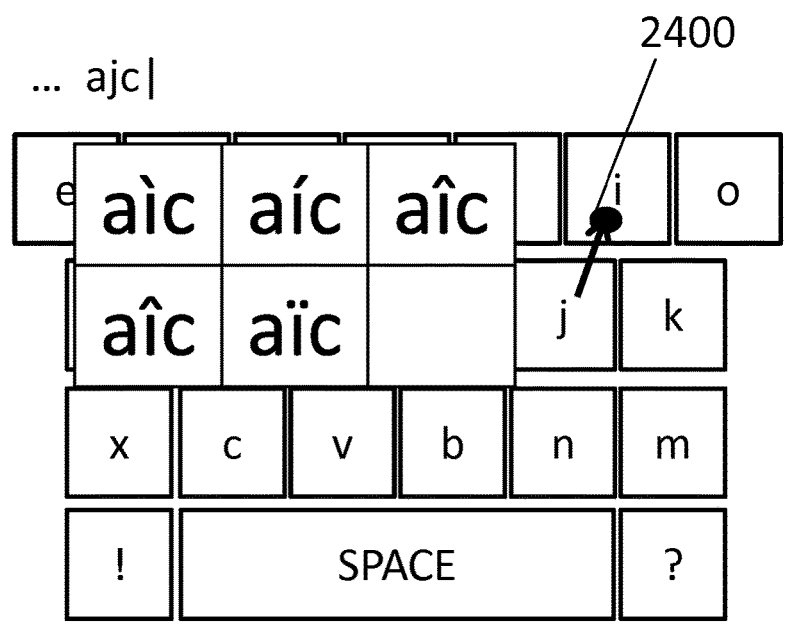

With reference to FIG. 23, dragging finger (2302) from the key "j" (2300) to the key "i" (2306), displays additional options such as other characters (2304) on the screen. The user can choose one of the other characters by, for example tapping on them. In some embodiments, the extra characters include the accented versions of the main character. For example, they can be "ì", "í", "î", "ï", "ĭ" or associated to the key whose main character is "i". When the user indicates that he wants to replace a first character with a second character (e.g., he drags his finger from a first key to a second key), all characters associated with the first key and the second key are considered. For example, if the user drags his finger from key "j" (2300) to key "i" (2306), the system/method/device displays several words (additional options such as other words (2304)), each generated by replacing the letter "j" with one of the letters "ì", "í", "î", "ï", or "ĭ" (FIG. 23). In some embodiments, if the user holds his finger on the second key for longer than a threshold time, the system/method/device displays the generated words (FIG. 24, dot (2400) indicates that the user has held his finger on the screen). In some embodiments, if the user does not hold his finger on the second key for longer than a threshold time, the system/method/device replaces the first character with the main character associated with the second key, and if the user holds his finger on the second key for longer than a threshold time, the system/method/device displays the generated words. In some embodiments, the displayed words include the word generated by replacing the first character with the main character corresponding with the second key.

Figure 25:
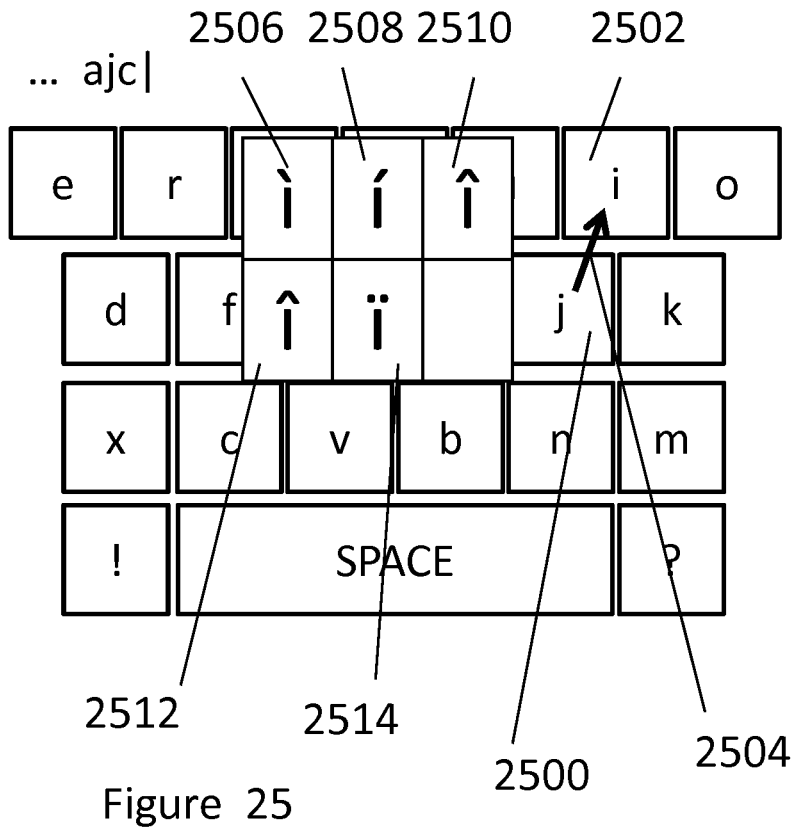
Figure 26:
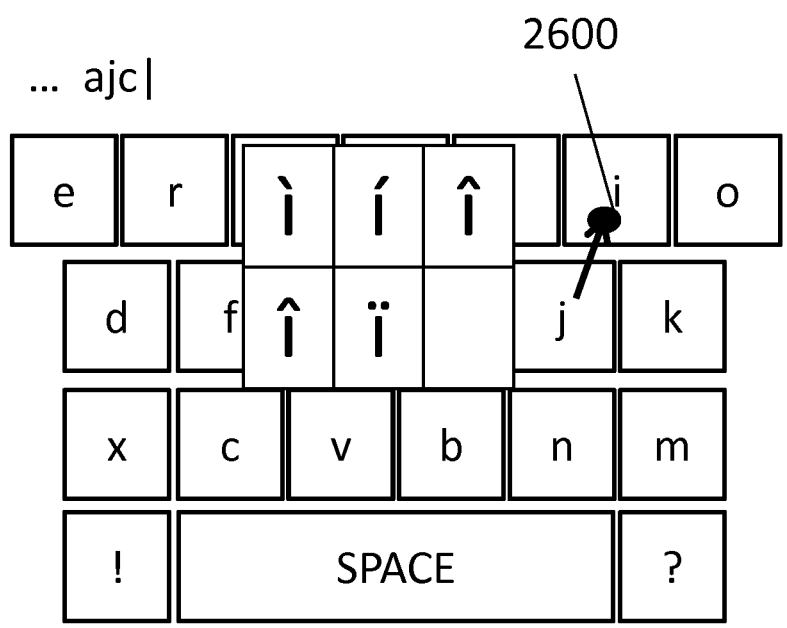

In some embodiments, as shown in FIG. 25, the computer may accept an input signal as a drag (2504) from key "j" (2500) to key "i" (2502) and the system/method/device displays several options for replacing the letter "j" (2500) with one of "ì" (2506), "í" (2508), "î" (2510), "ï" (2512), or "ĭ" (2514). In some embodiments, if the user holds (as shown in FIG. 26 as dot (2600)) his finger on the second key for longer than a threshold time, the system/method/device displays the extra characters and if the user selects one of them, the system/method/device replaces the first character with the selected character (FIG. 26). In some embodiments, if the user does not hold his finger on the second key for longer than a threshold time, the system/method/device replaces the first character with the main character associated with the second key, and if the user holds his finger on the second key for longer than a threshold time, the system/method/device displays the extra characters. In some embodiments, the main character is displayed in addition to the extra characters.

Figure 27:
Figure 28:
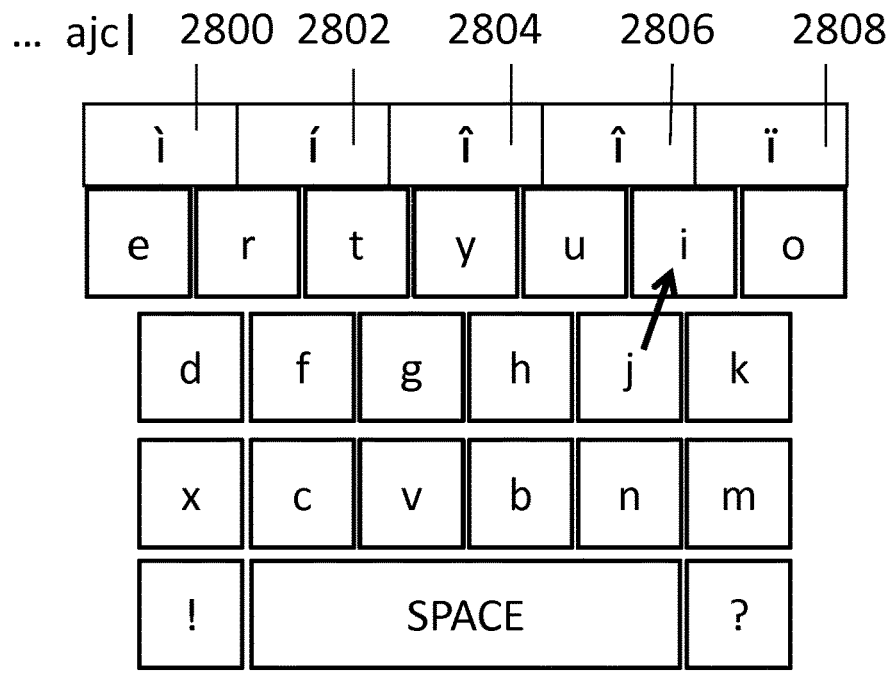

In some embodiments, the generated words or the extra characters are displayed on top of the keyboard. For example, in FIG. 27, at least two corrected input choices (e.g. 2700, 2702, 2704, 2706 and 2708) are on a raised portion that is above the virtual keyboard. In some embodiments, the system/method/device has word correction/word prediction feature and the generated words or the extra characters are displayed in the area used for displaying the words suggested by the word correction/word prediction algorithm (FIGS. 27 and 28). FIG. 28 depicts additional options (2800, 2802, 2804, 2806 and 2808).

Figure 29:
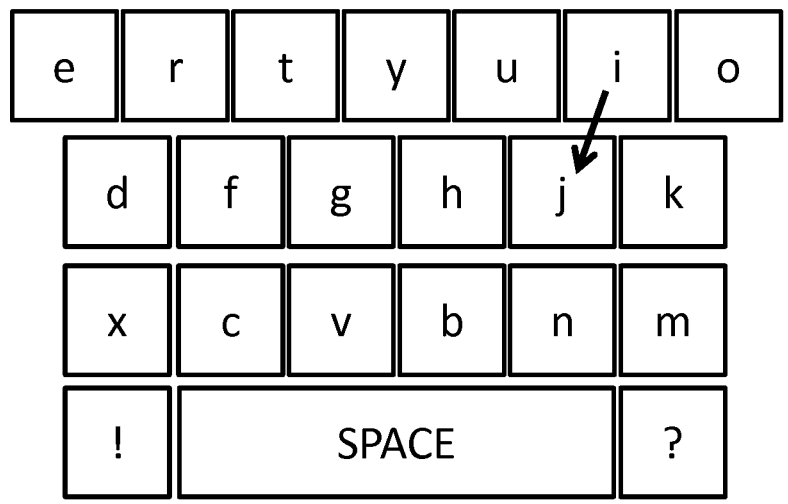
FIGS. 29-38 depict various aspects of corrected input on a virtual keyboard according to the present invention.
Figure 30:
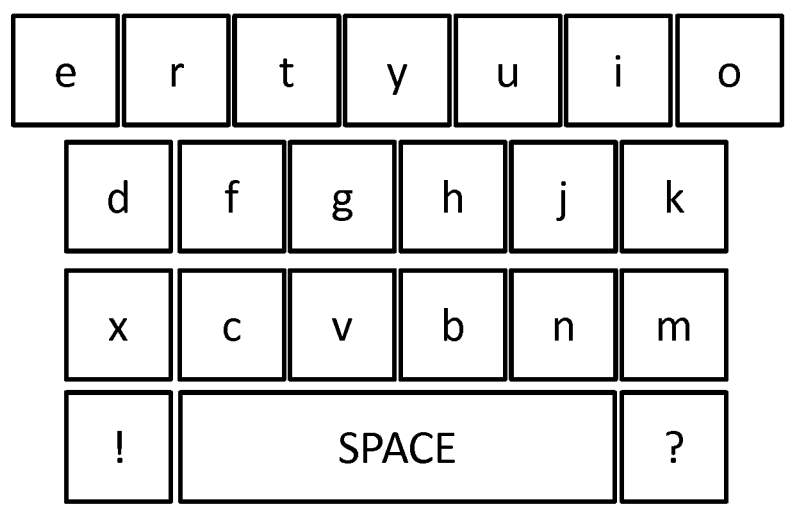

In some embodiments, if the user drags his finger from a first key to a second key, the system/method/device, replaces the last occurrence of one of the main character or extra characters associated with the first key with the main character associated with the second key (FIGS. 29 and 30).

Figure 31:
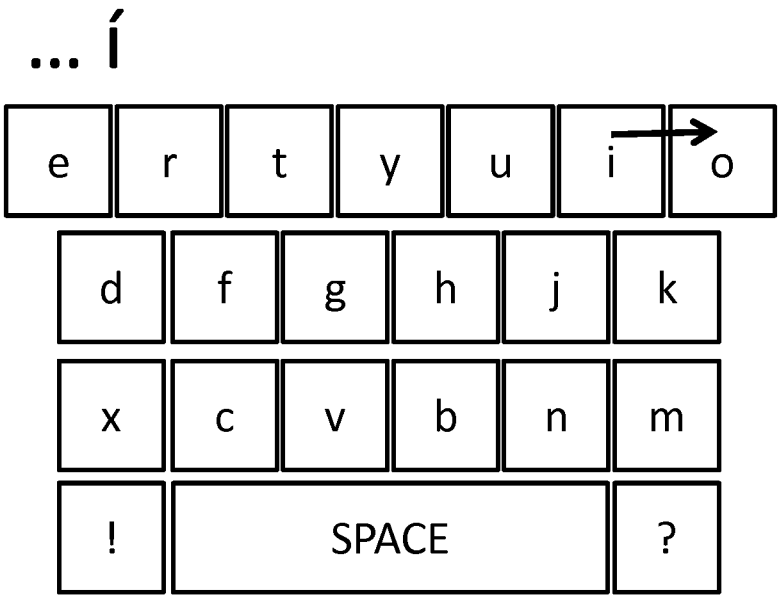
Figure 32:
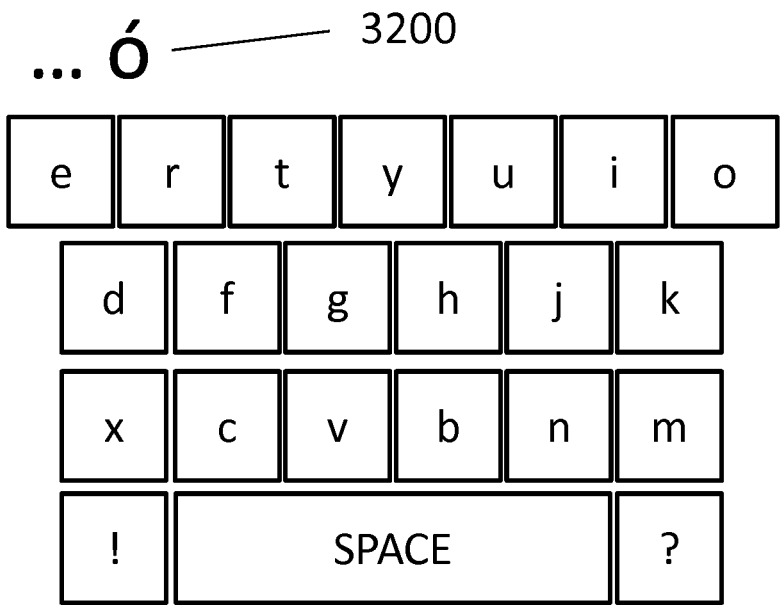

In some embodiments, the last character is an extra character associated with the first key and it is replaced with the corresponding extra character associated with the second key. For example, if the user has entered the acute accent "í", (i.e., "í") and drags his finger on the screen from left to right, the system/method/device replaces "í" with the acute accent "o", (i.e., "ó" (3200)) (FIGS. 31 and 32).

Figure 33:
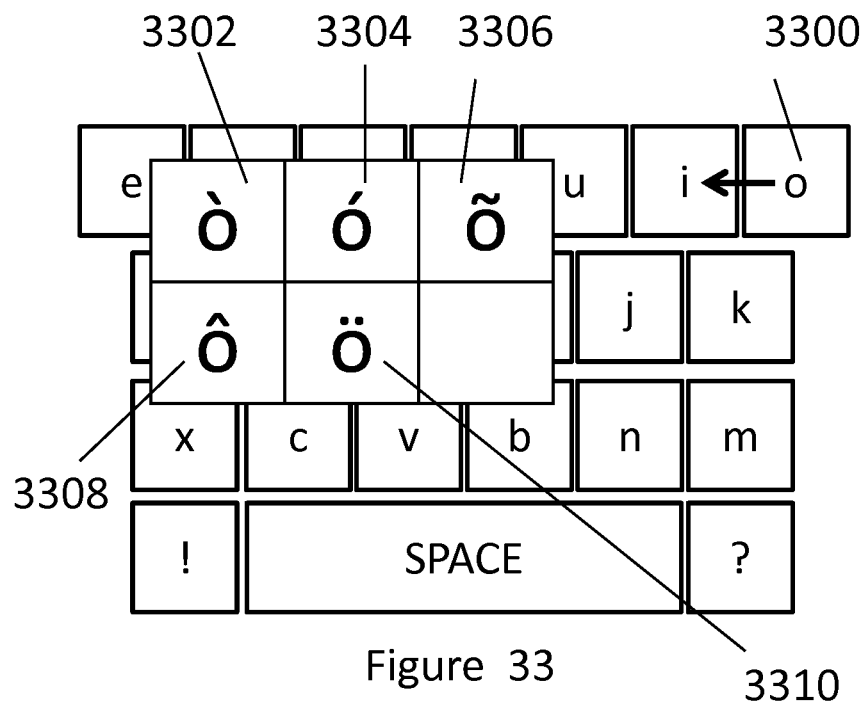
Figure 34:
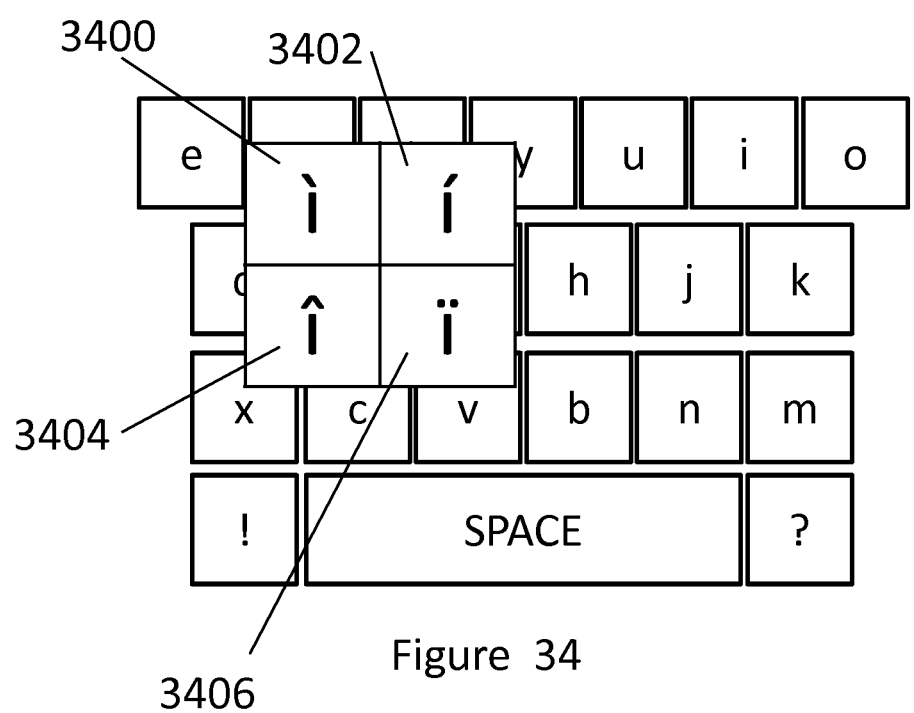
Figure 35:
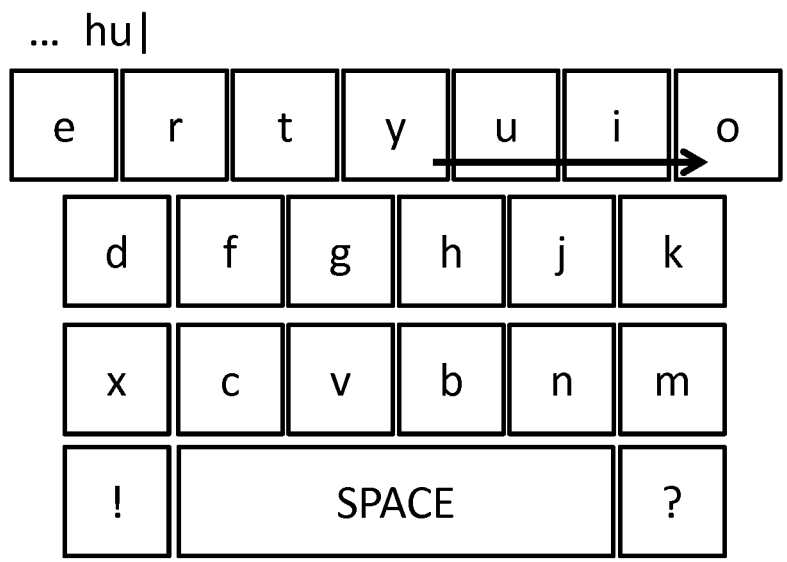
Figure 36:
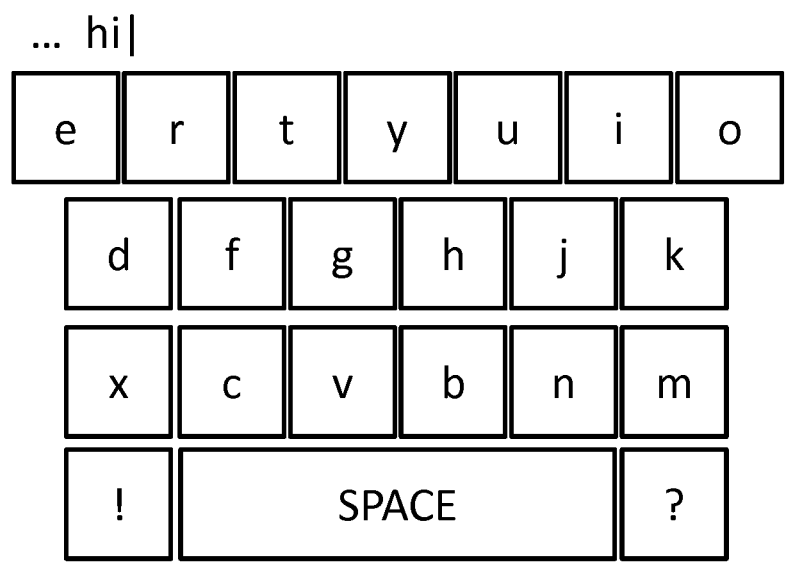

In some embodiments, as shown in FIGS. 33 and 34, if a first key is pressed for longer than a threshold time, the system/method/device displays the extra characters associated with the first key. For example, in FIG. 33, the key "o" (3300) is pressed for at least a threshold time and system/method/device displays the extra characters associated with the key "o" (3302, 3304, 3306, 3308 and 3310). If the user drags his finger from the first key to a second key, this may be done without first releasing the key "o" or after the key "o" is released, the system/method/device ends displaying of the extra characters associated with the first key (3302, 3304, 3306, 3308 and 3310), and displays the extra characters associated with the second key (3400, 3402, 3404 and 3406). According to one embodiment, a non-transitory program storage device having stored computer instructions that when executed cause one or more programmable control devices to: receive an input signal in a first level graphical user interface (3300) of the non-transitory program storage device requesting additional options for a key; display the first additional options in a first pop-out window in a graphical user interface of the non-transitory program storage device, wherein the first additional options displayed for a key are for first additional characters; accept an input signal which corresponds to a drag on the graphical user interface of the non-transitory program storage device, which directs the first pop-out window to close and a second pop-out window to open, wherein the second pop-out window has second additional options for second additional characters corresponding to a second key, accept an input signal which corresponds to a selected one of the second additional options to provide a selected character; and display the selected character. The term first level graphical user interface (3300) of the non-transitory program storage device is intended to refer to the fact that it is not in a pop-out window, but is the first level of the graphical user interface. The string is not erroneous. Here the idea is that the user may want to enter accented "O". He may press and hold down "I" by mistake. Thus, the pop out window will show accented "I". He can drag his finger on the screen to close the pop out window for "I" and open pop out window for "O". By way of example, the dragging must be done starting from "I" and ending on "O". In some embodiments, instead of pop-out windows, the additional options are displayed a raised portion of the keyboard. In another embodiment, the start and the end points are not important, only the direction of the dragging is important. The angle of the drag may also be used.

Figure 37:
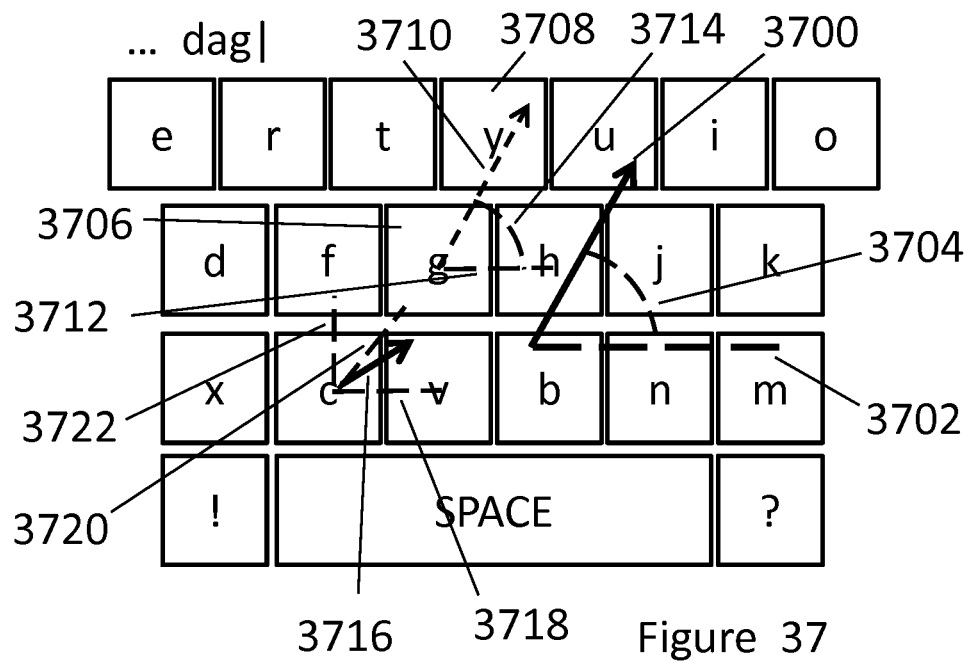
Figure 38:
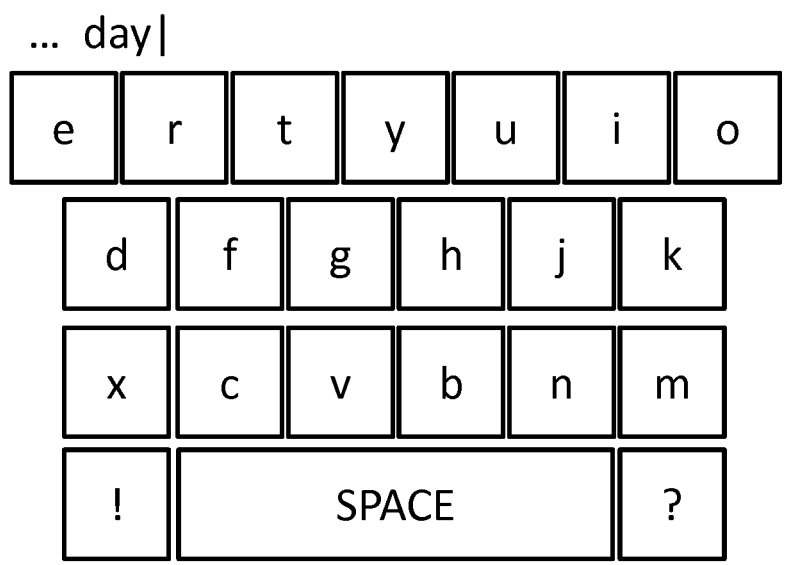
Figure 39:
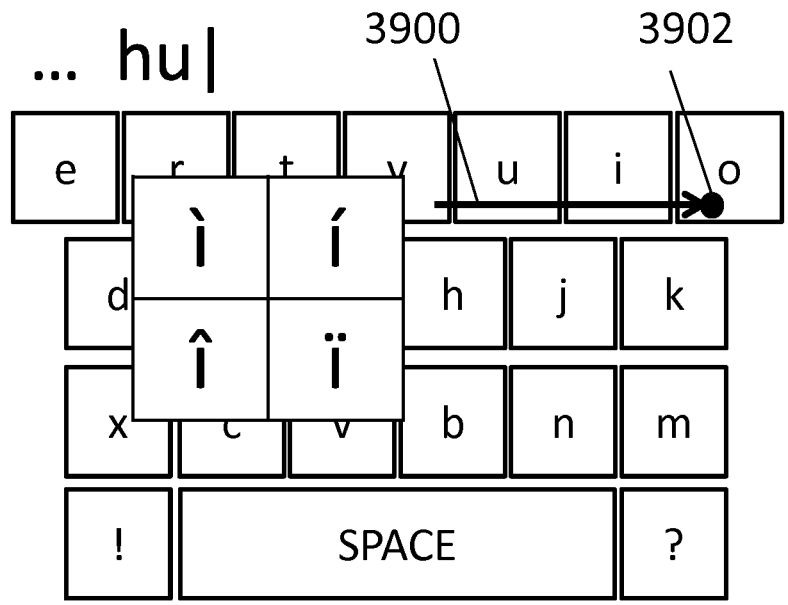
FIGS. 39-42 depict aspects of receiving input indicative of a key being pressed more than a threshold time on a portion of the virtual keyboard according to the present invention.
Figure 40:
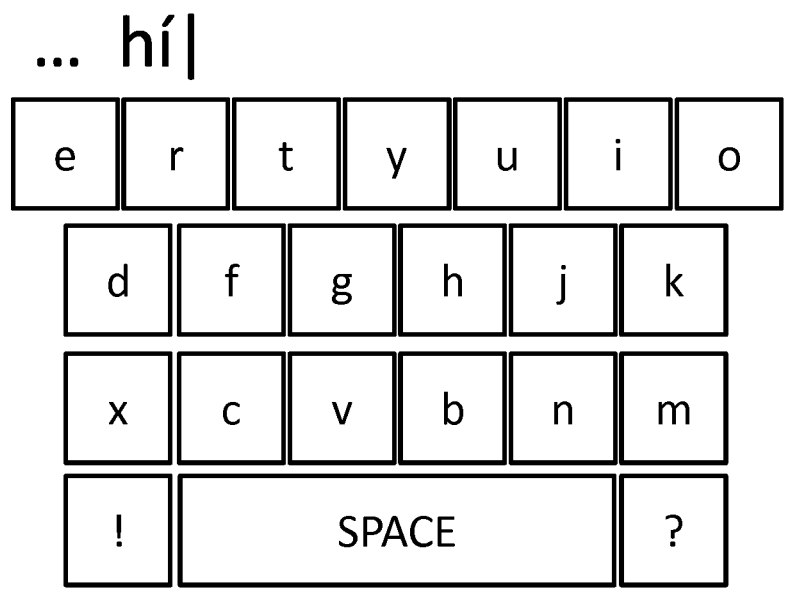

When using a keyboard of a small device such as a smart watch, it can be difficult to drag a finger from the erroneous key to the correct key. In some embodiments, a user can correct the last character of a selected string with a new character by dragging his finger in a first direction on the screen. The new character is found by moving on the keyboard starting from the key corresponding to the last character in the first direction and finding the adjacent key to the key of the last character (second key) and using the main character associated to the second key to replace the last character (FIGS. 35, 36, 37, and 38). In FIG. 37, the user has dragged his finger on the screen (3700). The key corresponding to the last character before the cursor is the key "g" (3706). The second key is the first key found by moving from the center of the key "g" in the direction that the user has dragged his finger on the screen (3700). In other words, if the user has dragged his finger on the screen, the angle of the drag with reference to a horizontal line (3702) is found (3704). The second key is the first key that is found when moving in the direction (3710) from the center of the key "g" with an angle (3714), with respect to a horizontal line (or reference) (3712), where the angle (3714) is equal to angle (3704) (i.e., 3700 and 3710 are parallel). If the user drags his finger upward and the last letter is "x", the second key will be "d". If there is empty space between the keys, the space is equally divided between keys, when finding the second key. Thus, the effective region of each key can be larger than the key itself. In some embodiments, there are n directions, d0, d1, . . . , d(n−1) with their corresponding angles angle0, angle1, . . . , angle(n−1). If the user moves his finger in direction d, whose angle is alpha, and (angle(i−1)+angle(i))/2<=alpha<(angle(i)+angle(i+1))/2, the angle of d is changed to angle(i) before finding the second key. For example, there might be 8 directions, d0, . . . , d7 corresponding to angles 0, 45, 90, 135, . . . , 315 degrees (in FIG. 37, d0 (3718), d1 (3720) and d2 (3722) are shown). If the user moves his finger in direction d whose angle alpha is 30 degrees (3816), (0+45)/2<=alpha<(45+90)/2, thus the angle is changed to 45 degrees before finding the second key (i.e., the second key is found by moving from key "c" in the direction of d1 (3720). Thus, the second key is "g"). As another example, if the user drags his finger on the screen in the direction d whose angle alpha is 320 degrees, (270+315)/2<=alpha<(315+(0+360))/2, the second key is found by moving in a direction whose angle is 315 degrees (note that 360 degrees is equivalent to 0 degrees, thus, adding 360 to 0). In some embodiments, if the user drags his finger on the screen (e.g. 3900) and holds (e.g. 3902) his finger on the screen for a longer than a threshold time, the system/method/device displays the extra characters associated with the second key so the user can choose one of them to replace the last character (FIGS. 39 and 40). In some embodiments, instead of displaying the associated extra characters, a list of words each generated by replacing the last character with one of the extra characters are displayed and the user chooses one of the words, to replace the selected word. In some embodiments, there are special keys to indicate various directions. Instead of dragging a finger on the screen to input the direction, one or more of the special keys are pressed. In some embodiments, the user swipes his finger on a key to replace the last character of the selected string with the swiped key. In some embodiments, the user swipes his finger on a key to replace one of the characters of the selected string with the swiped key. In some embodiments, the user swipes his finger on a key to replace one of the characters of the selected string with the swiped key and at least one other option is displayed on a raised portion of the keyboard, where the option corresponds to undoing the character replacement and replacing another character for the selected string with the swiped key.

In some embodiments, the last instance that a character from a set of characters in the selected string is used, is found and is replaced with a new character, where the new character is found from the key corresponding to the last instance that characters from a set of characters in the selected string is used and the direction of dragging finger on the screen. As an example, we have a set of characters {u, i, o} and u has been used in the string in location 3, "i" has been used in location 6 and "o" has been used in location 2, the last instance would be the last instance of "i" (i.e., 6). In some embodiments, the set of characters is the set of characters corresponding to the keys in the neighborhood of the coordinates where the dragging started. This can be useful especially if the keys of the keyboard are small. In many keyboards, the height of the keys is larger than their width. Thus, when pressing a key, the user may press the wrong key on the correct row. In some embodiments, the set of characters is the set of characters corresponding to the keys in the neighborhood of the coordinates where the dragging started, such that the keys are in the same row of the keyboard as the dragging started.

Figure 41:
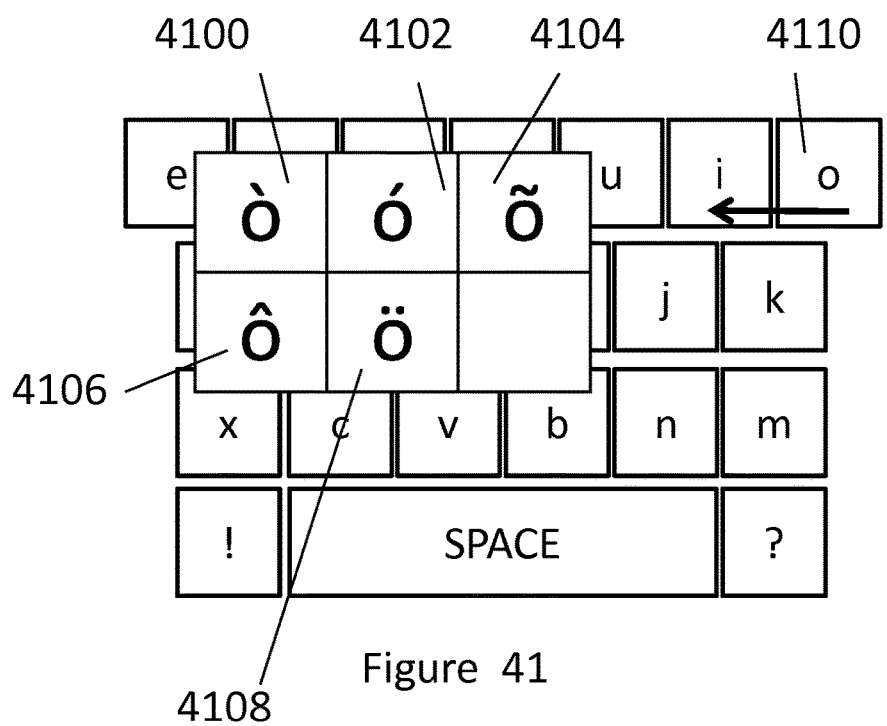
Figure 42:
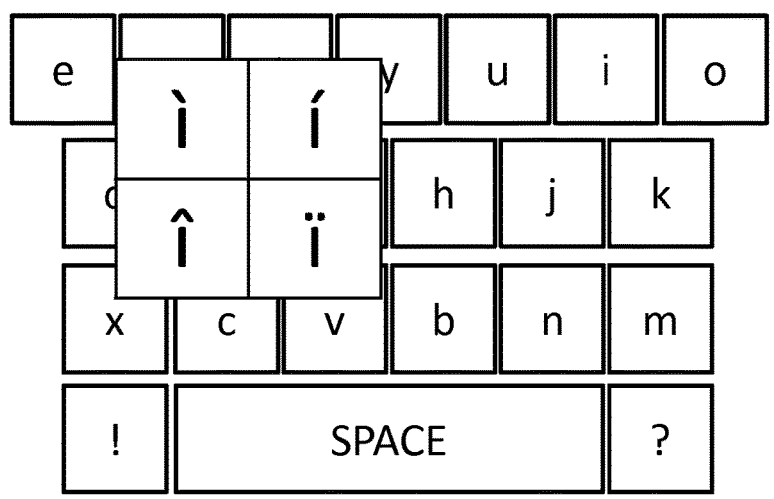

In some embodiments, if the user presses a first key for longer than a threshold time, the extra/additional characters (e.g. 4100, 4102, 4104, 4106 and 4108) associated with the first key (e.g. 4110) are displayed on the screen (FIG. 41). According to some embodiments, the additional options for corrected input correspond to the direction of the additional input on a portion of the virtual keyboard. For example, as shown in FIGS. 41 and 42, if the user drags his finger in a direction on the screen, the system/method/device stops displaying the extra characters associated with the first key and displays the extra characters associated with the second key, where the second key is found from the location of the first key and the direction and the angle the user dragged his finger on the screen. The additional input may also be receiving input that a gesture has been performed.

Figure 43:
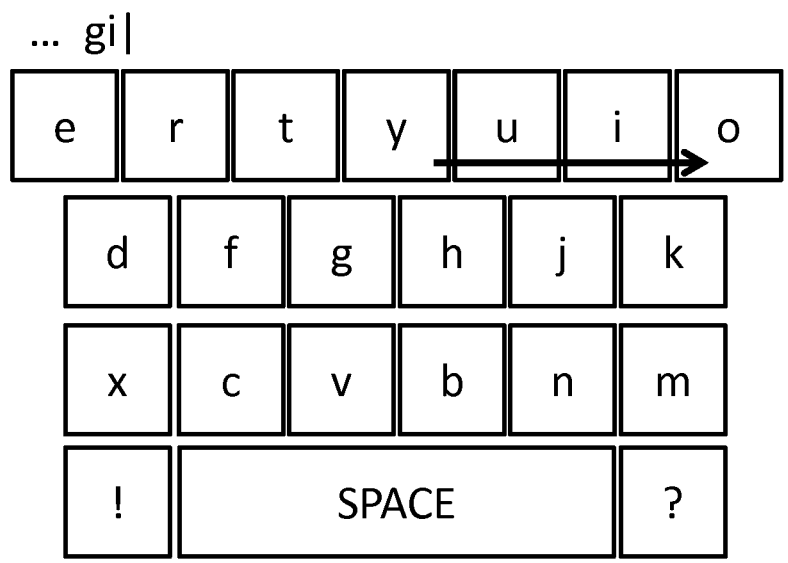
FIGS. 43-45 depict examples of predetermined inputs on a virtual keyboard to provide a corrected character string.
Figure 44:
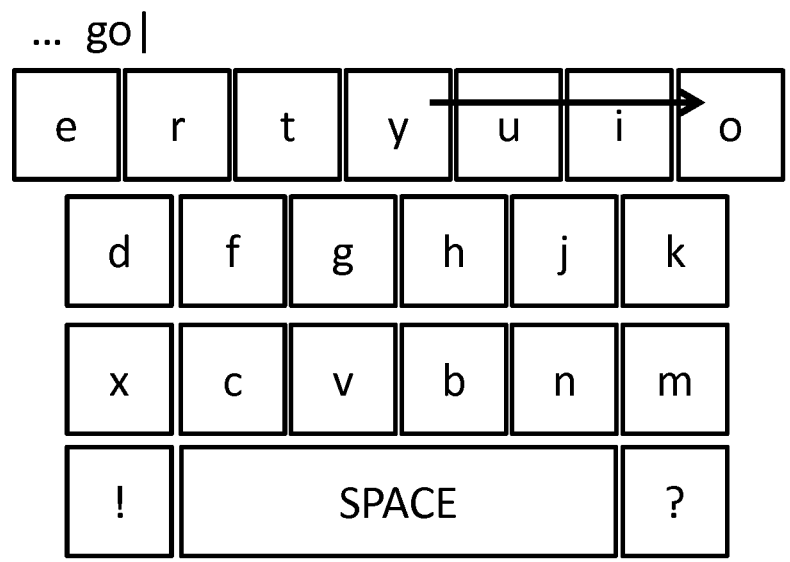
Figure 45:
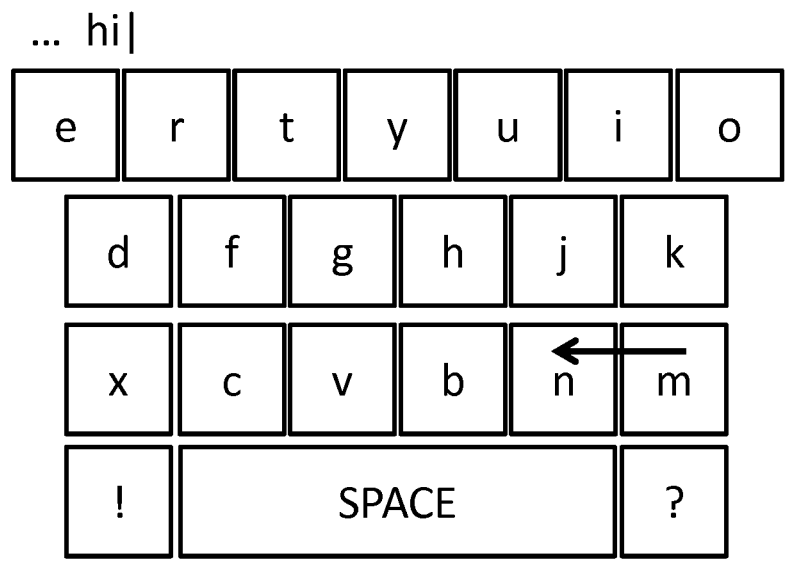
Figure 46:
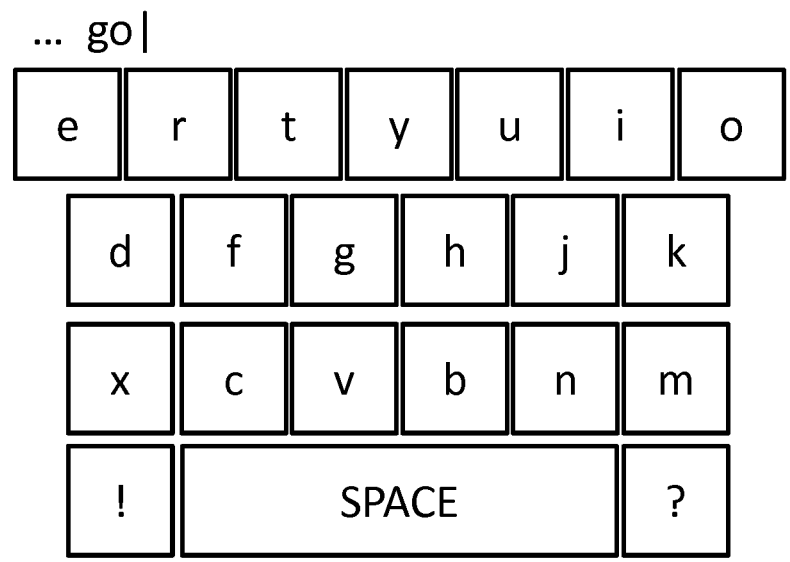
FIG. 46 depicts aspects of corrected input on a virtual keyboard according to the present invention.

In some embodiments, if the user drags his finger on the screen twice, the character before the last character is replaced with a second character, where the second character is found using the location of the key corresponding to the character before the last character and the direction of the second drag on the keyboard (in other words, if the user drags his finger on the screen once, the last character is replaced with a second character, where the second character is found using the location of the key corresponding to the last character. If the user drags his finger on the screen a second time, the previous character replacement is undone and the character before the last character is changed) (FIGS. 43 and 44). In some embodiments, the first and the second drags must be in the same direction.

In some embodiments, if the user drags his finger on the screen n times, the n-th character from the end of the selected string is replaced with a second character, where the second character found using the location of the key corresponding to the n-th character from the end of the selected string and the direction of the last drag on the keyboard. In some embodiments, all drags must be in the same direction.

Figure 47:
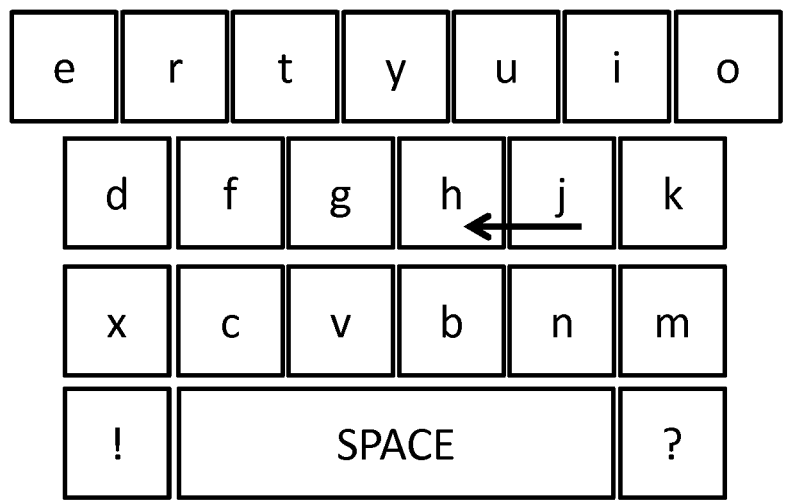
FIG. 47 depict an example of a predetermined input on a virtual keyboard to provide a corrected character string.
Figure 48:
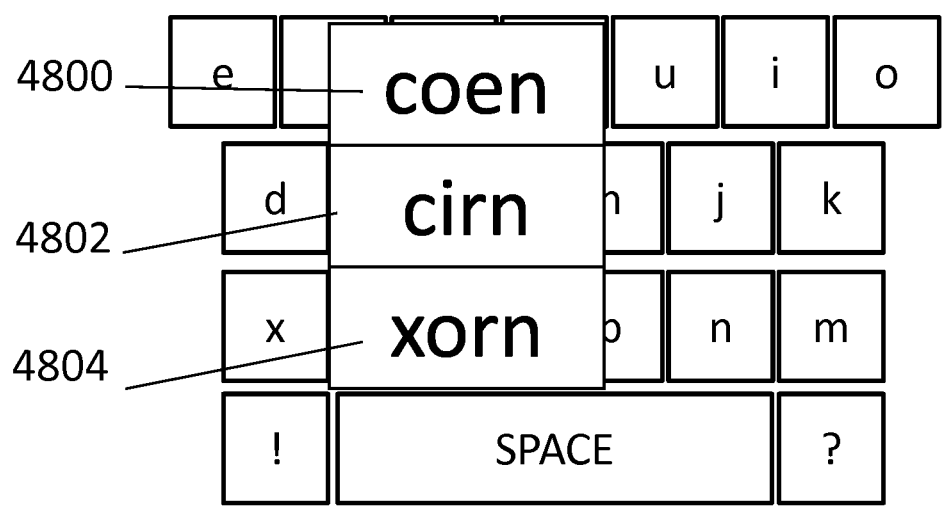
FIG. 48 depicts at least one corrected input choices on a raised portion of the virtual keyboard according to the present invention.
Figure 49:
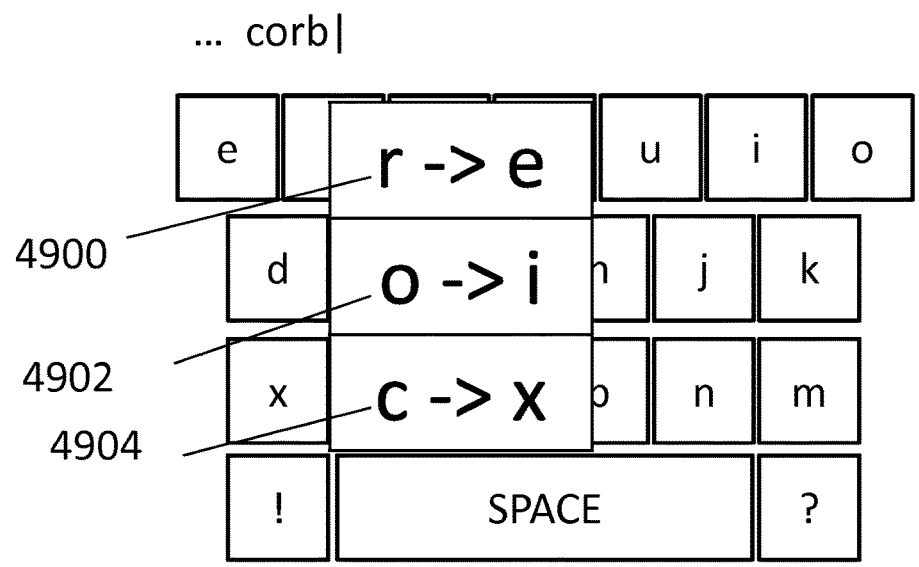
FIG. 49 depicts at least one corrected input choices as transformations on a raised portion of the virtual keyboard according to the present invention.
Figure 50:
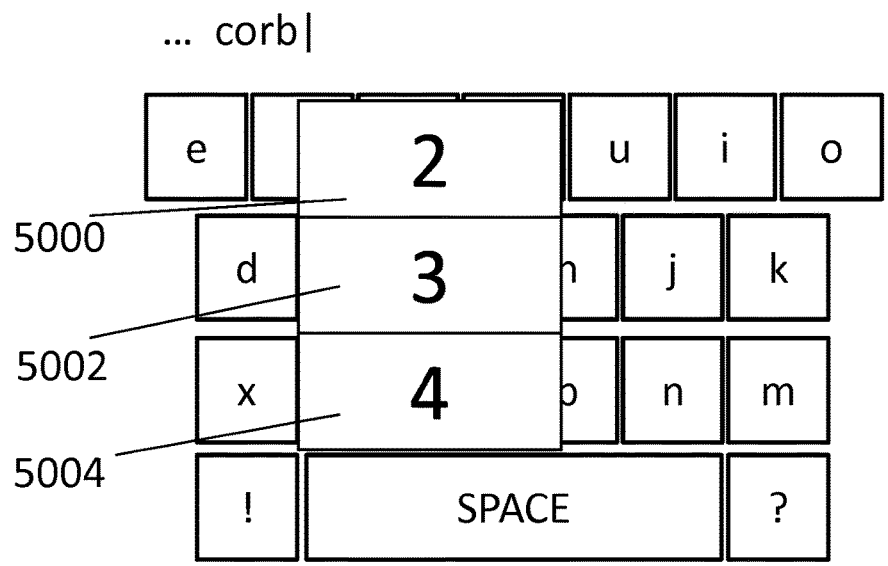
FIG. 50 depicts at least one corrected input choices as values of index i on a raised portion of the virtual keyboard according to the present invention.

In some embodiments, if the user drags his finger on the screen once, the last character is replaced with a second character, where the second character is found using the location of the key corresponding to the last character, the angle of the drag and the direction of the drag on the screen, and a list of words are displayed on the screen such that each word is generated by replacing the i-th character from the end of the selected string with a character found based on the i-th character, the angle of the drag and the direction of the drag on the screen, where 2<=i<=n and n is the length of the selected string (FIGS. 47 and 48). In some embodiments, the words (4800, 4802 and 4804) are displayed on top of (or on a raised portion of) the keyboard. In some embodiments, the system/method/device has word correction/word prediction feature and the generated words or the extra characters are displayed in the area used for displaying the words suggested by the word correction/word prediction algorithm. In some embodiments, instead of replacing the last character with a second character, the resulting word is displayed alongside other words so the user can select one of the words. In some embodiments, instead of displaying words, the transformations are displayed (4900, 4902, 4904) (FIG. 49). In some embodiments, instead of displaying words, the values of index i (5000, 5002 and 5004) are displayed (FIG. 50). In some embodiments instead of replacing the last character, k-th character from the end of the string is replaced, where $2<=k<=n$ and one or more other words generated by replacing other characters of the string are displayed on a raised portion of the screen. In some embodiments, k-th character from the start of the string is replaced, where $1<=k<=n$ and one or more other words generated by replacing other characters of the string are displayed on a raised portion of the screen.

In some embodiments, the list of words are displayed only if the user drags his finger on the screen and holds his finger on the screen for longer than a threshold time.

Figure 51:
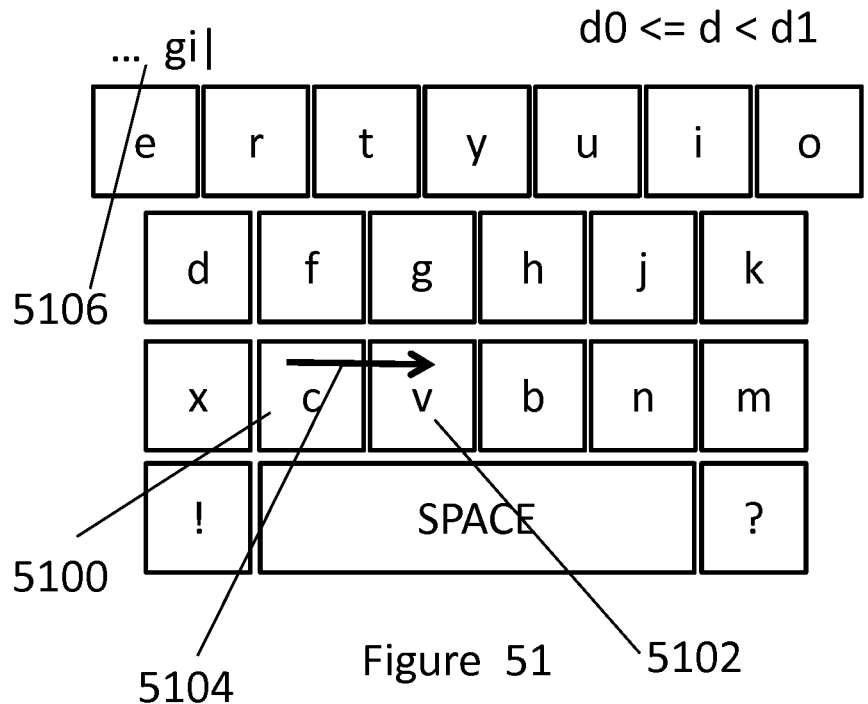
FIGS. 51-55 depict examples of predetermined inputs, including predetermined distance drags and predetermined time holds, on a virtual keyboard to provide a corrected character string.

In some embodiments, there are thresholds $0<d0<d1<d2<\ldots<dn$. If the user drags his finger for distance d on the screen, where $d(i-1)<=d<di$, and lifts his finger from the screen, the i-th character from the end of the selected string is replaced with a second character, where the second character is found using the location of the key corresponding to the i-th character from the end of the selected string, the angle of the drag and the direction of the drag on the screen (FIG. 51).

Figure 52:
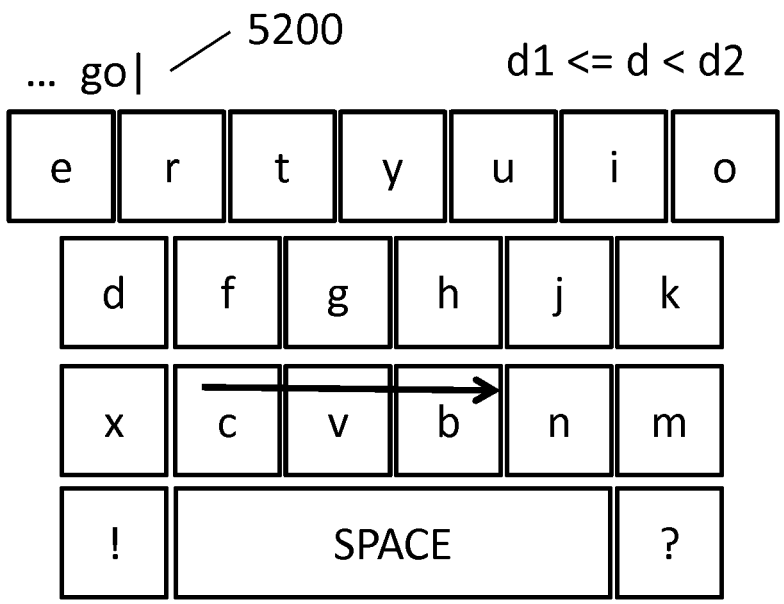
Figure 53:
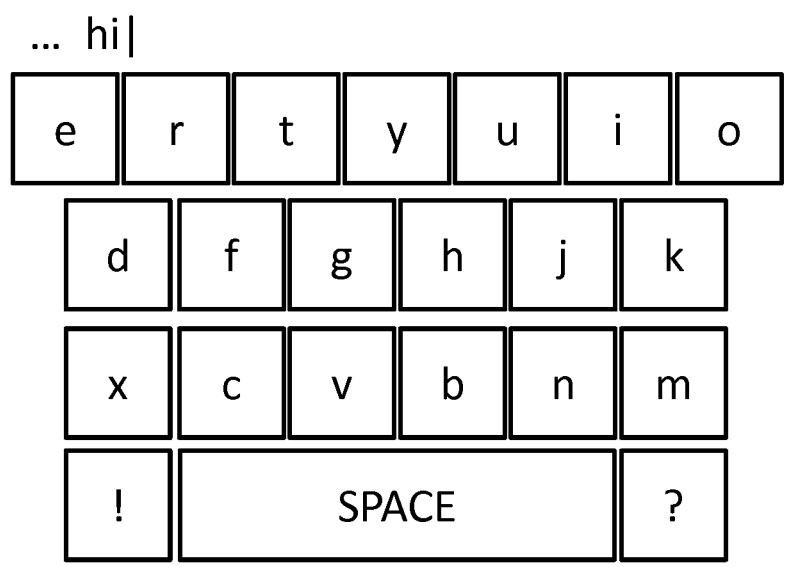

In some embodiments, if the user drags his finger on the screen for a distance longer than d1, the first character from the end of the selected string is replaced. If the user continues to drag his finger on the screen, without lifting his finger from the screen, for a distance longer than d2, the previous change in the first character from the end of the selected string is undone and the second character from the end of the selected string is changed. If the user continues to drag his finger on the screen for a distance longer than di, the previous change in the (i−1)-th character is undone and the i-th character is changed (FIGS. 51, 52 and 53, the drag shown in FIG. 52 is the continuation of the drag shown in FIG. 51). In the example shown in FIG. 51, the input signal is a drag, the erroneous string having at least one incorrect character (5106) is changed from "gi" to "go" (5200) in FIG. 52. The drag can be anywhere on the keyboard. In this embodiment, only the angle of the drag and the direction of the drag from 5100 to 5102 are important.

In some embodiments, if the user drags his finger on the screen for a distance longer than a threshold, the last character is replaced with a second character, where the second character is found using the location of the key corresponding to the last character, the angle of the drag and the direction of the drag on the keyboard. After dragging the finger on the screen, if the user holds his finger on the screen, the system/method/device displays a list of choices for performing the replacement for the i-th character before the end of the selected string with a new character found using the location of the key corresponding to the i-th character, the angle of the drag and the direction of dragging, where $1<i<=n$. In some embodiments, instead of displaying the choices of replacement, the actual words resulted when performing the replacements are displayed. In some embodiments, there are thresholds $0<t1<t2<\ldots<tn$. If after dragging the finger on the screen, the user holds his finger on the screen for a period t, where $t(i-1)<=t<ti$ and $1<i<=n$ the i-th character from the end of the selected string is replaced with a second character, where the second character is found using the location of the key corresponding to the i-th character from the end of the selected string, the angle of the drag and the direction of the drag on the screen and the previous change on the (i−1)-th character is undone.

In some embodiments, if the user drags his finger in a first direction on the screen i times, where $1<=i<=$length of the string, to replace the i-th character from the end of the selected string with a new character and then he drags his finger on the screen again in the first direction, the system/method/device replaces the (i+1)-th character from the end of the selected string with a new character and the previous change on the i-th character is undone. In some embodiments, if the user drags his finger on the screen again, but in the opposite of the first direction, the system/method/device replaces the (i−1)-th character from the end of the selected string with a new character and the previous change on the i-th character is undone (FIGS. 43, 44, 45 and 46).

Figure 54:
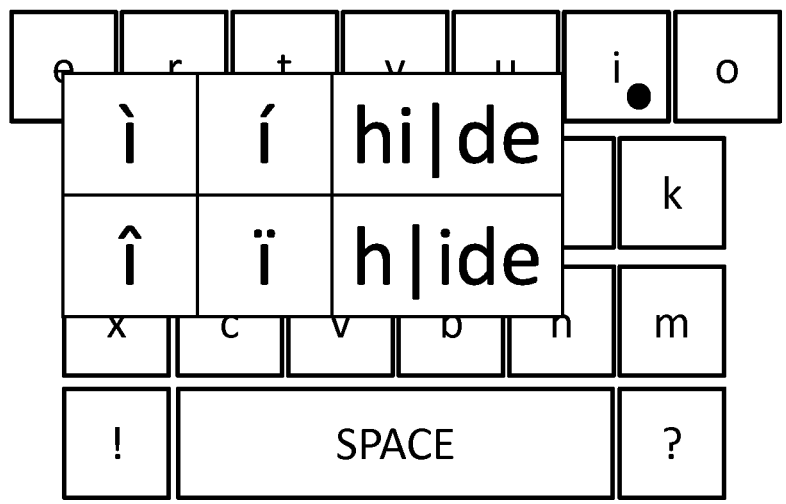
Figure 55:
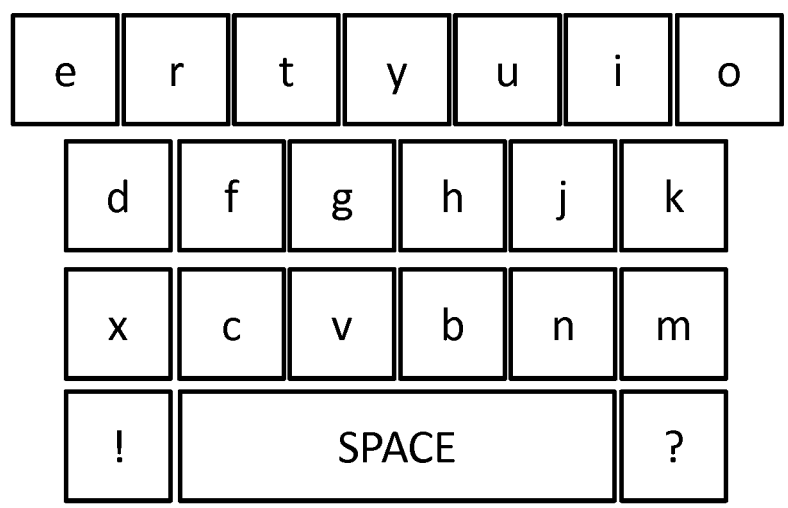

In some embodiments, in addition to the main character displayed on a key, one or more other characters (extra characters) are associated to the key. Pressing the key for longer than a threshold time or performing a gesture such as swiping the key up, displays the other characters on the screen as well as at least one option from the two options of moving the cursor on the screen to the location after or before the instance of the main character of the key in the selected string (FIGS. 54 and 55). The user can choose to enter one of the other characters or choose to move the cursor by for example tapping on the desired option. In some embodiments, if there are n instances of the main character in the selected string, 2n options corresponding to moving the cursor to before or after of each instance of the main character in the selected string are displayed for the user to choose.

Figure 56:
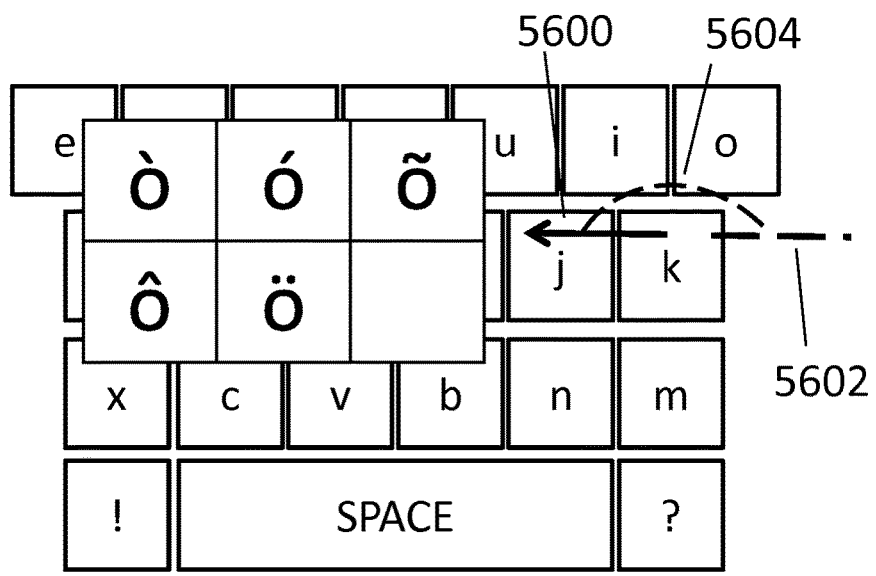
FIGS. 56 and 57 depict when additional options displayed for a requested character are for an incorrect character according to the present invention.
Figure 57:
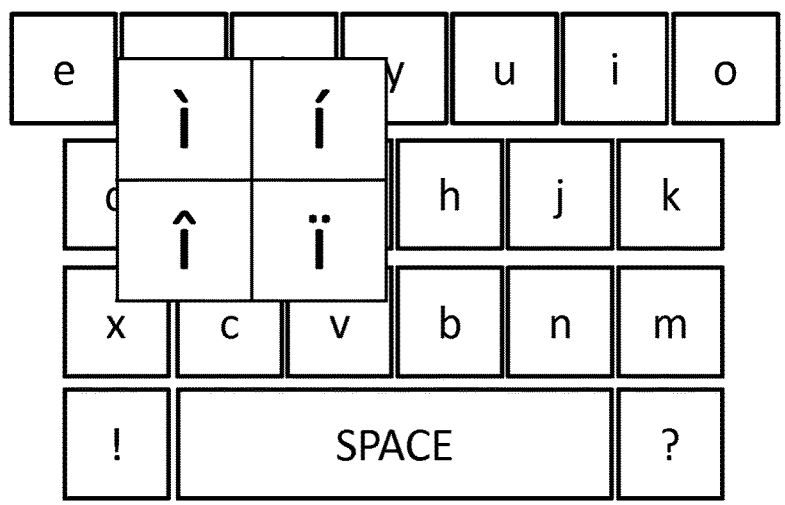

In some embodiments, if a first key is pressed for longer than a threshold time, the system/method/device displays the extra characters associated with the first key. If the user drags his finger in a first direction (5600), the system/method/device ends displaying of the extra characters associated with the first key, and displays the extra characters associated with the second key, where the second key is found based on the first key, the angle of the drag (5604) with respect to a horizontal line (5602) and the first direction (FIGS. 56 and 57).

It should be understood that in the above embodiments, to detect a drag on the screen or a swipe gesture a threshold is used. If the distance of the drag or the swipe is larger than the threshold, the gesture is considered as a drag or a swipe.

It should be understood that in the above embodiments, unless a drag must start from a particular location or end in a particular location on the screen, it can be performed anywhere on the screen (e.g., outside the keyboard area) or it can be performed using a device such as a mouse or a trackpad. Alternatively, it is possible to use multiple keys, each key corresponding to one direction and press one or multiple of them to indicate a direction, instead of dragging a finger on the screen (e.g., 4 keys to indicate swiping right, left, up, down and pressing two of them to indicate diagonal swipes. As another example, it is possible to use 8 keys).

It should be understood that in the above embodiments, instead of displaying several words, each generated by changing one of the characters of the selected string, and allowing the user to choose one, it is possible to show, instead of each generated word, the character replacement which results in the generated word or to show the index of the character which is changed. Furthermore, these choices can be displayed above the keyboard and in the area used by the auto-correction/word prediction algorithm if such feature exists in the keyboard.

It should be understood that in the above embodiments, instead of changing the last character of the string, the first character or the j-th character can be changed, where j is a constant integer.

It should be understood that in the above embodiments, instead of the i-th character from the end of the screen, the i-th character from the beginning of the screen can be changed. It should be understood that in the above embodiments, when multiple choices (strings) are displayed on the screen for the user to select one, it is possible to automatically select one of the strings to replace the selected string. Other choices (strings) can be displayed on the screen and if the user selects one of the strings, that string replaces the automatically selected string. If the user presses one of the keys of the keyboard or moves the cursor or if the user does not press any of the choices within a period of time, the choices offered can be erased from the screen.

It should be understood that in the above embodiments, instead of considering one selected string, multiple selected strings can be considered (e.g., two strings located before the cursor) and when multiple choices (strings) are displayed on the screen for the user to select one, the choices can correspond to the multiple selected strings. Thus, for example, instead of modifying a word located before the cursor, a user can modify the word before that word without moving the cursor.

It should be understood that in the above embodiments, the order of entering erroneous and correct characters can be changed (i.e., the correct character can be entered first and the erroneous character can be entered after that).

It should be understood that in the above embodiments, a selected string can be a list of characters between two separators, where separators may include one or more of "!", "*", """, "(", ")", ";", ":", "@", "&", "=", "+", "$", ",", "/", "?", "%", "#", "[", and "]". This can be used for example to make corrections in the URLs.

Figure 60:
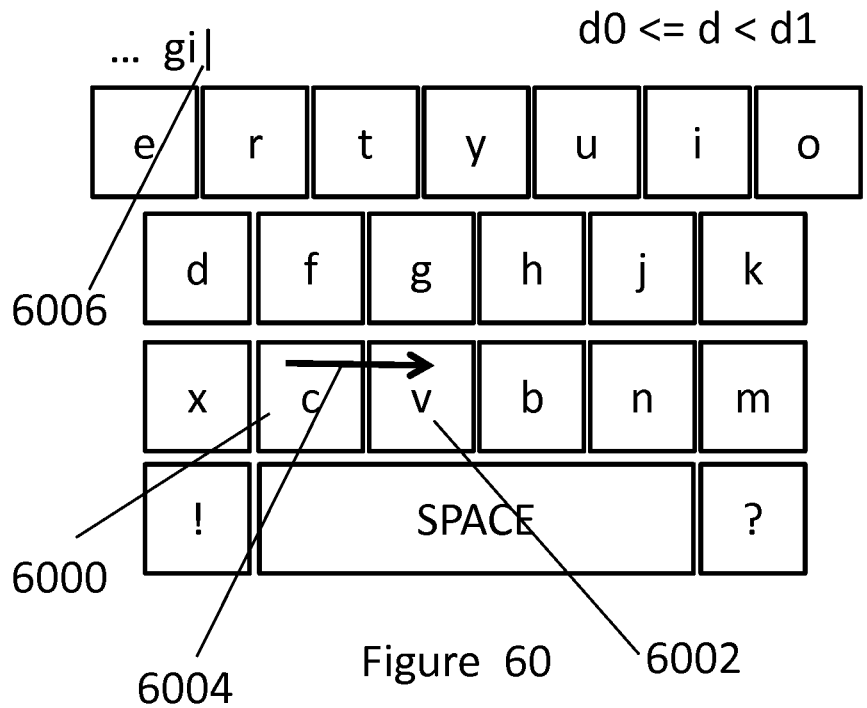
FIGS. 60 and 61 depict an incorrect character determined according to the length of the drag on the virtual keyboard.
Figure 61:
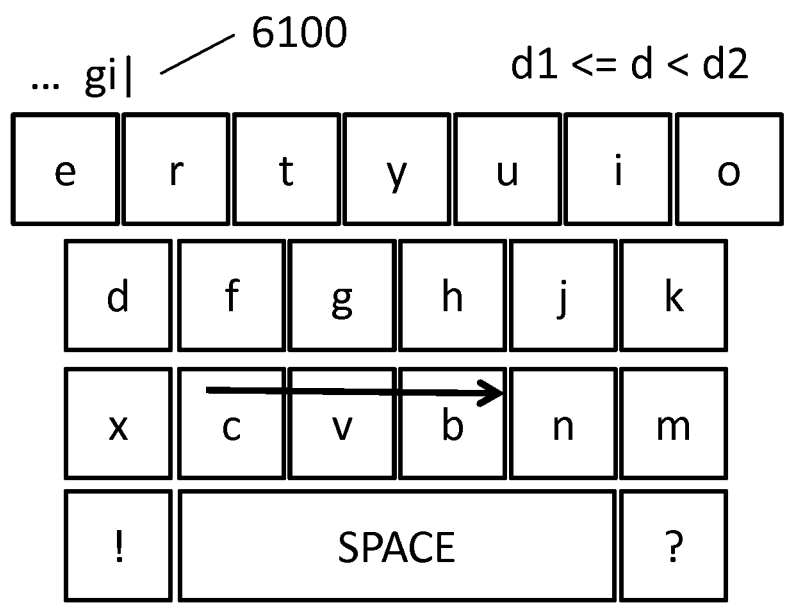

In some embodiments, there are multiple regions on the keyboard. When a user drags her finger on the keyboard, depending on the region in which the drag is performed, one of the characters of the string before the cursor is corrected. In this way, the incorrect character may be determined according to the region of the keyboard in which the drag is performed. Since regions can be larger than the keys of the keyboard, on a small screen, it will be easier for a user to drag his finger in a given region than for example, starting the drag from a given key. For example, in FIG. 58, there are two regions. The user has dragged her finger from left to right in Region 581. Thus, the first letter before the cursor is corrected. The resulting string will be "go". If the user drags her finger from left to right in Region 592, of FIG. 59, the second letter before the cursor is corrected. The resulting string will be "hi" (as shown in FIG. 59). According to another embodiment, the incorrect character is determined according to the length of the drag on the virtual keyboard. In FIG. 60, the user has dragged his finger on the screen from left to right (6000 to 6002) for a distance d (6004), where d0<=d<d1. Thus, the first letter before the cursor (6006) is corrected. The resulting string will be "go". In FIG. 61, the user has dragged his finger on the screen from left to right for a distance d, where d1<=d<d2. Thus, the second letter before the cursor (6100) is corrected. The resulting string will be "hi". The corrected input may also be determined according to the start point of the drag on the virtual keyboard.

A non-transitory program storage device having stored computer instructions that when executed cause one or more programmable control devices to: receive an input signal having at least one character to provide an erroneous string having at least one incorrect character; display the erroneous string having at least one incorrect character on a graphical user interface; accept an input signal which corresponds to a drag on a virtual keyboard; locate an incorrect character according to the location of the cursor on a graphical user interface; determine the corrected input according to the angle of the drag on the virtual keyboard and a slide direction of the drag on the virtual keyboard; replace the incorrect character in the erroneous string with the corrected input to provide a corrected character string; and display the corrected character string. The present invention may not utilize the input key (i.e., the start point of the slide) to find what character has to be changed. The character that has to be changed may be a character that has already been accepted by the system and is being displayed. This character is not the character entered using the slide input (it may have been entered using an earlier input on the keyboard, entered using word suggestion/prediction feature of a keyboard, entered using cut and paste, or entered previously using this error correction technique). The character may be found based on the location of the cursor on the text. This information and the slide angel and the slide direction are used to find the target character. The target character is not found based on the input key (i.e., the target character is not found based on the start point of the slide). According to another embodiment, the character is found based on the location of the cursor on the text and the start point of the slide. This information and the slide angel and the slide direction are used to find the target character.

It should be understood that the foregoing relates to preferred embodiments of the invention and that modifications may be made without departing from the spirit and scope of the invention as set forth in the following claims.

I claim:

1. A non-transitory program storage device having stored computer instructions that when executed cause one or more programmable control devices to:
receive a first input signal corresponding to an action other than a drag on a virtual keyboard, the first signal having at least two characters to provide an erroneous string having an incorrect character, the string ending with a last character wherein the incorrect character is any character in the erroneous string other than the last character;
display the erroneous string;
after the display of the erroneous string, receive a second input signal which corresponds to a drag on a virtual keyboard from a key corresponding to the incorrect character on the virtual keyboard to a key corresponding to a corrected input character on the virtual keyboard, wherein the one or more programmable control devices recognize that the drag triggers entry into an error correction mode;
replace the incorrect character in the erroneous string with the corrected input character to provide a corrected character string; and
display the corrected character string;
wherein the replacement and the display of the corrected character string occur without requiring any input other than the first and the second input signals.

2. The non-transitory program storage device of claim 1, further comprising computer instructions that when executed cause the one or more programmable control devices to cause the corrected input character to have the same case as the incorrect character.

3. The non-transitory program storage device of claim 1, wherein the computer instructions that when executed cause the one or more programmable control devices to display at least one corrected input character choice on a raised portion of the virtual keyboard and in response to accepting input corresponding to one chosen corrected input character choice from the at least one corrected input choices on a raised portion replaces at least a portion of the corrected character string with the one chosen corrected input character choice to provide a second corrected character string; and displays the second corrected character string instead of the corrected character string.

4. The non-transitory program storage device of claim 3, wherein the at least one corrected input character choices on a raised portion of the virtual keyboard are determined based on at least one of spell check, auto-correction and word prediction computer instructions.

5. The non-transitory program storage device of claim 3, wherein one of the at least one corrected input character choices on a raised portion of the virtual keyboard is for a word that occurs prior to the word before the cursor.

6. The non-transitory program storage device of claim 1, wherein the second input signal on a portion of the virtual keyboard triggers the display of additional options for corrected input characters; the additional options including extra characters not previously visible on the virtual keyboard.

7. The non-transitory program storage device of claim 6, wherein the second input signal includes input indicative of a key being pressed more than a threshold time on a portion of the virtual keyboard or input that a gesture has been performed on a portion of the virtual keyboard.

8. The non-transitory program storage device of claim 1, wherein the key corresponding to the corrected input character on the virtual keyboard is a shift key and the incorrect character in the erroneous string is replaced with the same character with a different case.

9. The non-transitory program storage device of claim 1, wherein the key corresponding to the corrected input character on the virtual keyboard is a delete key and the incorrect character in the erroneous string is replaced with a null corrected character.

10. The non-transitory program storage device of claim 1, wherein the key corresponding to a corrected input character on the virtual keyboard is not a delete key.

11. The non-transitory program storage device of claim 1, wherein the erroneous string is inputted by pressing keys on the virtual keyboard.

12. A non-transitory program storage device having stored computer instructions that when executed cause one or more programmable control devices to:
receive a first input signal corresponding to an action other than swiping on keys, the first signal having at least two characters to provide an erroneous string having an incorrect character, the string ending with a last character wherein the incorrect character is any character in the erroneous string other than the last character;
display the erroneous string;
after the display of the erroneous string, receive a second input signal which corresponds to a swipe on a key on a virtual keyboard, the key corresponding to the incorrect character, wherein the one or more programmable control devices recognize that the swipe triggers entry into an error correction mode; and
accept a third input signal on the virtual keyboard which corresponds to a key corresponding to a correct character;
wherein in the error correction mode the one or more programmable control devices operate to:
replace the incorrect character in the erroneous string with the corrected character to provide a corrected character string; and
display the corrected character string.

13. The non-transitory program storage device of claim 12, further comprising computer instructions that when executed cause one or more programmable control devices to change from the error correction mode to a normal operation mode after the corrected character string is displayed.

14. The non-transitory program storage device of claim 12, further comprising computer instructions that when executed cause the one or more programmable control devices to cause the corrected character to have the same case as the incorrect character.

15. The non-transitory program storage device of claim 12, wherein the second input signal on a portion of the virtual keyboard triggers the display of additional options for corrected input; the additional options including extra characters not previously visible on the virtual keyboard.

16. The non-transitory program storage device of claim 12, wherein the second input signal includes input indicative of a key being pressed more than a threshold time on a portion of the virtual keyboard or input that a gesture has been performed on a portion of the virtual keyboard.

17. The non-transitory program storage device of claim 12, wherein the key corresponding to a correct character is not a delete key.

18. The non-transitory program storage device of claim 12, wherein the erroneous string is inputted by pressing keys on the virtual keyboard.

19. A non-transitory program storage device having stored computer instructions that when executed cause one or more programmable control devices to:
receive, by one or more keys being pressed on a virtual keyboard, a first input signal corresponding to an action other than a drag on a virtual keyboard, the first signal having at least two characters to provide an erroneous string having an incorrect character, the string ending with a last character wherein the incorrect character is any character in the erroneous string other than the last character;
display the erroneous string;
after the display of the erroneous string, receive a second input signal which corresponds to a drag on a virtual keyboard from a key corresponding to a corrected input character on the virtual keyboard to a key corresponding to the incorrect character on the virtual keyboard, wherein the one or more programmable control devices recognize that the drag triggers entry into an error correction mode;
replace the incorrect character in the erroneous string with the corrected input to provide a corrected character string; and
display the corrected character string;
wherein the replacement and the display of the corrected character string occur without requiring any input other than the first and the second input signals; and
wherein the key corresponding to the corrected input is not a delete key.

20. A non-transitory program storage device having stored computer instructions that when executed cause one or more programmable control devices to:
- receive, by one or more keys being pressed on a virtual keyboard, a first input signal corresponding to an action other than a drag on a virtual keyboard, the first signal having at least two characters to provide an erroneous string having an incorrect character, the string ending with a last character wherein the incorrect character is any character in the erroneous string other than the last character;
- display the erroneous string;
- after the display of the erroneous string, receive a second input signal which corresponds to a swipe a non delete key on a virtual keyboard, the non-delete key corresponding to a corrected character, wherein the one or more programmable control devices recognize that the swipe triggers entry into an error correction mode; and
- accept a third input signal which corresponds to a key on the virtual keyboard, the key corresponding to the incorrect character;
- wherein in the error correction mode the one or more programmable control devices operate to:
  - replace the incorrect character in the erroneous string with the correct character to provide a corrected character string; and
  - display the corrected character string.

\* \* \* \* \*